United States Patent
Jefferies et al.

(10) Patent No.: US 11,694,481 B2
(45) Date of Patent: *Jul. 4, 2023

(54) RENTAL/CAR-SHARE VEHICLE ACCESS AND MANAGEMENT SYSTEM AND METHOD

(71) Applicant: Enterprise Holdings, Inc., St. Louis, MO (US)

(72) Inventors: James E. Jefferies, Glendale, CA (US); Rod W. DeMay, Los Angeles, CA (US); Gurgen L. Lachinyan, Palo Alto, CA (US); Derik Reiser, Maryville, IL (US); Jeffrey T. Lauman, St. Louis, MO (US)

(73) Assignee: Enterprise Holdings, Inc., St. Louis, MO (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/346,462

(22) Filed: Jun. 14, 2021

(65) Prior Publication Data

US 2021/0407217 A1    Dec. 30, 2021

Related U.S. Application Data

(63) Continuation of application No. 16/725,883, filed on Dec. 23, 2019, now Pat. No. 11,037,375, which is a
(Continued)

(51) Int. Cl.
*G07B 15/00* (2011.01)
*G07C 5/08* (2006.01)
(Continued)

(52) U.S. Cl.
CPC .............. *G07B 15/00* (2013.01); *B60R 25/01* (2013.01); *B60R 25/045* (2013.01);
(Continued)

(58) Field of Classification Search
CPC ....... G07B 15/00; B60R 25/01; B60R 25/045; B60R 25/2018; B60R 25/24;
(Continued)

(56) References Cited

U.S. PATENT DOCUMENTS 3,624,608 A    11/1971   Altman et al.
3,665,397 A     5/1972   Di Napoli et al.
(Continued)

FOREIGN PATENT DOCUMENTS

AU    2013903725    2/2016
EP    2573738 A1    3/2013
(Continued)

OTHER PUBLICATIONS

Prosecution History for U.S. Appl. No. 16/725,883, now U.S. Pat. No. 11,037,375, filed Dec. 23, 2019, 269 pages.
(Continued)

*Primary Examiner* — Russell Frejd
(74) *Attorney, Agent, or Firm* — Thompson Coburn LLP

(57) ABSTRACT

An apparatus and operational method are disclosed that use control hardware resident in a vehicle to enable a remote computing system to wirelessly communicate with the vehicle. The control hardware includes a processor configured to interface with a wireless network and the vehicle through, respectively, a wireless network interface and a vehicle interface. A plurality of CAN (control area network) bus transceivers may exist within the vehicle interface operable to allow the processor to interface with multiple vehicle types. The processor may then be configured to automatically detect an identifier for the vehicle though the vehicle interface and automatically select a CAN bus transceiver from the plurality of CAN bus transceivers based on
(Continued)

the detected identifier. The processor can then communicate with the vehicle's CAN bus via the selected CAN bus transceiver.

23 Claims, 19 Drawing Sheets

Related U.S. Application Data continuation of application No. 15/652,129, filed on Jul. 17, 2017, now Pat. No. 10,515,489, which is a continuation-in-part of application No. 15/154,389, filed on May 13, 2016, now Pat. No. 9,710,975, which is a continuation of application No. 14/315,586, filed on Jun. 26, 2014, now Pat. No. 9,373,201, which is a continuation of application No. 13/830,754, filed on Mar. 14, 2013, now Pat. No. 8,768,565.

(60) Provisional application No. 61/650,483, filed on May 23, 2012.

(51) Int. Cl.
*G06Q 50/30* (2012.01)
*G06Q 30/0645* (2023.01)
*B60R 25/24* (2013.01)
*G07C 5/00* (2006.01)
*B60R 25/045* (2013.01)
*G07C 9/00* (2020.01)
*B60R 25/20* (2013.01)
*B60R 25/01* (2013.01)

(52) U.S. Cl.
CPC .......... *B60R 25/2018* (2013.01); *B60R 25/24* (2013.01); *G06Q 30/0645* (2013.01); *G06Q 50/30* (2013.01); *G07C 5/008* (2013.01); *G07C 5/0808* (2013.01); *G07C 9/00571* (2013.01); *G07C 2205/02* (2013.01)

(58) Field of Classification Search
CPC .... G06Q 30/0645; G06Q 50/30; G07C 5/008; G07C 5/0808; G07C 9/00571; G07C 2205/02
See application file for complete search history.

(56) References Cited

U.S. PATENT DOCUMENTS

| | | |
|---|---|---|
| 3,754,122 A | 8/1973 | Dinapoli et al. |
| 4,663,626 A | 5/1987 | Smith |
| 4,817,166 A | 3/1989 | Gonzalez et al. |
| 4,835,533 A | 5/1989 | Akutsu |
| 4,895,009 A | 1/1990 | Kleefeldt et al. |
| 4,931,789 A | 6/1990 | Pinnow |
| 4,965,821 A | 10/1990 | Bishop et al. |
| 5,066,853 A | 11/1991 | Brisson |
| 5,159,334 A | 10/1992 | Baumert et al. |
| 5,206,643 A | 4/1993 | Eckelt |
| 5,218,367 A | 6/1993 | Sheffer et al. |
| 5,255,547 A | 10/1993 | Burr et al. |
| 5,289,369 A | 2/1994 | Hirshberg |
| 5,420,568 A | 5/1995 | Iida et al. |
| 5,467,080 A | 11/1995 | Stoll et al. |
| 5,477,214 A | 12/1995 | Bartel |
| 5,504,674 A | 4/1996 | Chen et al. |
| 5,515,285 A | 5/1996 | Garrett, Sr. et al. |
| 5,541,571 A | 7/1996 | Ochs et al. |
| 5,568,120 A | 10/1996 | LeMense et al. |
| 5,583,486 A | 12/1996 | Kersten |
| 5,630,209 A | 5/1997 | Wizgall et al. |
| 5,660,246 A | 8/1997 | Kaman |
| 5,664,113 A | 9/1997 | Worger et al. |
| 5,679,984 A | 10/1997 | Talbot et al. |
| 5,686,910 A | 11/1997 | Timm et al. |
| 5,734,330 A | 3/1998 | Nakamura |
| 5,751,073 A | 5/1998 | Ross |
| 5,774,060 A | 6/1998 | Ostermann et al. |
| 5,812,067 A | 9/1998 | Bergholz et al. |
| 5,812,070 A | 9/1998 | Tagami et al. |
| 5,898,230 A | 4/1999 | Bartel et al. |
| 5,914,671 A | 6/1999 | Tuttle |
| 5,933,090 A | 8/1999 | Christenson |
| 5,939,975 A | 8/1999 | Tsuria et al. |
| 6,006,148 A | 12/1999 | Strong |
| 6,013,956 A | 1/2000 | Anderson, Jr. |
| 6,028,537 A | 2/2000 | Suman et al. |
| 6,031,465 A | 2/2000 | Burgess |
| 6,040,638 A | 3/2000 | Howell |
| 6,127,917 A | 10/2000 | Tuttle |
| 6,144,293 A | 11/2000 | Plaschko et al. |
| 6,148,091 A | 11/2000 | DiMaria |
| 6,157,315 A | 12/2000 | Kokubo et al. |
| 6,169,943 B1 | 1/2001 | Simon et al. |
| 6,172,608 B1 | 1/2001 | Cole |
| 6,181,024 B1 | 1/2001 | Geil et al. |
| 6,181,991 B1 | 1/2001 | Kondo et al. |
| 6,185,487 B1 | 2/2001 | Kondo et al. |
| 6,192,236 B1 | 2/2001 | Irvin |
| 6,225,890 B1 | 5/2001 | Murphy |
| 6,240,365 B1 | 5/2001 | Bunn |
| 6,253,980 B1 | 7/2001 | Murakami et al. |
| 6,339,745 B1 | 1/2002 | Novik |
| 6,356,836 B1 | 3/2002 | Adolph |
| 6,376,930 B1 | 4/2002 | Nagao et al. |
| 6,434,459 B2 | 8/2002 | Wong et al. |
| 6,459,967 B1 | 10/2002 | Otto |
| 6,480,098 B2 | 11/2002 | Flick |
| 6,484,784 B1 | 11/2002 | Weik, III et al. |
| 6,493,616 B1 | 12/2002 | Rossow et al. |
| 6,509,829 B1 | 1/2003 | Tuttle |
| 6,523,741 B1 | 2/2003 | DiMaria et al. |
| 6,529,805 B2 | 3/2003 | Aldrich, III et al. |
| 6,594,579 B1 | 7/2003 | Lowrey et al. |
| 6,604,033 B1 | 8/2003 | Banet et al. |
| 6,617,975 B1 | 9/2003 | Burgess |
| 6,618,650 B1 | 9/2003 | Nakai et al. |
| 6,636,145 B1 | 10/2003 | Murakami et al. |
| 6,636,790 B1 | 10/2003 | Lightner et al. |
| 6,647,328 B2 | 11/2003 | Walker |
| 6,650,977 B2 | 11/2003 | Miller |
| 6,664,888 B1 | 12/2003 | Bishop |
| 6,671,594 B2 | 12/2003 | Miller |
| 6,687,587 B2 | 2/2004 | Kacel |
| 6,693,563 B2 | 2/2004 | Flick |
| 6,696,981 B1 | 2/2004 | Hashimoto |
| 6,697,024 B2 | 2/2004 | Fuerst et al. |
| 6,697,730 B2 | 2/2004 | Dickerson |
| 6,703,946 B2 | 3/2004 | Flick |
| 6,708,879 B2 | 3/2004 | Hunt |
| 6,732,031 B1 | 5/2004 | Lightner et al. |
| 6,736,322 B2 | 5/2004 | Gobburu et al. |
| 6,741,187 B2 | 5/2004 | Flick |
| 6,748,211 B1 | 6/2004 | Isaac et al. |
| 6,765,500 B2 | 7/2004 | Flick |
| 6,766,233 B2 | 7/2004 | Odinak et al. |
| 6,771,188 B2 | 8/2004 | Flick |
| 6,771,981 B1 | 8/2004 | Zalewski et al. |
| 6,778,068 B2 | 8/2004 | Wolfe |
| 6,781,507 B1 | 8/2004 | Birchfield et al. |
| 6,784,809 B2 | 8/2004 | Flick |
| 6,789,003 B2 | 9/2004 | Magner et al. |
| 6,792,295 B1 | 9/2004 | Hanevich et al. |
| 6,798,355 B2 | 9/2004 | Flick |
| 6,803,861 B2 | 10/2004 | Flick |
| 6,809,636 B2 | 10/2004 | Metlitzky et al. |
| 6,816,089 B2 | 11/2004 | Flick |
| 6,819,269 B2 | 11/2004 | Flick |
| 6,828,902 B2 | 12/2004 | Casden |
| 6,838,998 B1 | 1/2005 | Brown et al. |
| 6,844,827 B2 | 1/2005 | Flick |
| 6,850,153 B1 | 2/2005 | Murakami et al. |

(56) References Cited

U.S. PATENT DOCUMENTS

| | | |
|---|---|---|
| 6,850,154 B2 | 2/2005 | Emmerling |
| 6,850,898 B1 | 2/2005 | Murakami et al. |
| 6,853,907 B2 | 2/2005 | Peterson et al. |
| 6,853,910 B1 | 2/2005 | Oesterling et al. |
| 6,859,009 B2 | 2/2005 | Jablin |
| 6,877,665 B2 | 4/2005 | Challa et al. |
| 6,882,905 B2 | 4/2005 | Hall et al. |
| 6,882,906 B2 | 4/2005 | Geisler et al. |
| 6,885,738 B2 | 4/2005 | White et al. |
| 6,892,116 B2 | 5/2005 | Geisler et al. |
| 6,898,493 B2 | 5/2005 | Ehrman et al. |
| 6,901,318 B1 | 5/2005 | Morronigiello et al. |
| 6,919,865 B2 | 7/2005 | Tamaru |
| 6,924,729 B1 | 8/2005 | Aschauer et al. |
| 6,931,308 B2 | 8/2005 | Read |
| 6,941,197 B1 | 9/2005 | Murakami et al. |
| 6,945,303 B2 | 9/2005 | Weik, III |
| 6,947,881 B1 | 9/2005 | Murakami et al. |
| 6,952,156 B2 | 10/2005 | Arshad et al. |
| 6,960,990 B2 | 11/2005 | McKibbon |
| 6,963,794 B2 | 11/2005 | Geber et al. |
| 6,965,323 B2 | 11/2005 | Uehara et al. |
| 6,967,567 B1 | 11/2005 | Hashimoto |
| 6,975,997 B1 | 12/2005 | Murakami et al. |
| 7,027,808 B2 | 4/2006 | Wesby |
| 7,030,732 B2 | 4/2006 | Tuttle |
| 7,034,655 B2 | 4/2006 | Magner et al. |
| 7,035,631 B2 | 4/2006 | Schwinke et al. |
| 7,042,333 B2 | 5/2006 | Dix et al. |
| 7,062,376 B2 | 6/2006 | Oesterling |
| 7,069,119 B2 | 6/2006 | Ueda et al. |
| 7,091,857 B2 | 8/2006 | Lanigan et al. |
| 7,106,171 B1 | 9/2006 | Burgess |
| 7,116,989 B2 | 10/2006 | Mazzara et al. |
| 7,119,709 B2 | 10/2006 | Magner et al. |
| 7,129,852 B2 | 10/2006 | Aslund et al. |
| 7,133,659 B2 | 11/2006 | Zalewski et al. |
| 7,136,747 B2 | 11/2006 | Raney |
| 7,142,099 B2 | 11/2006 | Ross et al. |
| 7,146,270 B2 | 12/2006 | Nozaki et al. |
| 7,154,384 B2 | 12/2006 | Nitou |
| 7,165,040 B2 | 1/2007 | Ehrman et al. |
| 7,167,084 B2 | 1/2007 | Proefke et al. |
| 7,171,381 B2 | 1/2007 | Ehrman et al. |
| 7,173,517 B2 | 2/2007 | Kondo et al. |
| 7,177,738 B2 | 2/2007 | Diaz |
| 7,181,409 B1 | 2/2007 | Murakami et al. |
| 7,184,866 B2 | 2/2007 | Squires et al. |
| 7,188,070 B2 | 3/2007 | Dar et al. |
| 7,218,925 B2 | 5/2007 | Crocker et al. |
| 7,219,235 B2 | 5/2007 | Rumble |
| 7,224,261 B2 | 5/2007 | Shimomura |
| 7,224,266 B2 | 5/2007 | Taipale |
| 7,228,122 B2 | 6/2007 | Oyagi et al. |
| 7,230,545 B2 | 6/2007 | Nath et al. |
| 7,233,227 B2 | 6/2007 | Lemoult |
| 7,245,997 B2 | 7/2007 | Kitao et al. |
| 7,248,151 B2 | 7/2007 | McCall |
| 7,266,435 B2 | 9/2007 | Wang et al. |
| 7,271,701 B2 | 9/2007 | Kokubu et al. |
| 7,289,024 B2 | 10/2007 | Sumcad et al. |
| 7,312,691 B2 | 12/2007 | Zambo et al. |
| 7,313,467 B2 | 12/2007 | Breed et al. |
| 7,321,814 B2 | 1/2008 | Kanda et al. |
| 7,323,970 B1 | 1/2008 | Murray et al. |
| 7,327,230 B2 | 2/2008 | Metlitzky et al. |
| 7,332,998 B2 | 2/2008 | Beehler et al. |
| 7,340,400 B2 | 3/2008 | McGinn et al. |
| 7,346,439 B2 | 3/2008 | Bodin |
| 7,356,494 B2 | 4/2008 | Ehrman et al. |
| 7,366,677 B1 | 4/2008 | Liu et al. |
| 7,457,693 B2 | 11/2008 | Olsen et al. |
| 7,486,181 B2 | 2/2009 | Olsen et al. |
| 7,570,151 B2 | 8/2009 | Tuttle |
| 7,571,036 B2 | 8/2009 | Olsen et al. |
| 7,637,631 B2 | 12/2009 | McDermott et al. |
| 7,656,271 B2 | 2/2010 | Ehrman et al. |
| 7,683,774 B2 | 3/2010 | Olsen et al. |
| 7,707,054 B2 | 4/2010 | Ehrman et al. |
| 7,710,245 B2 | 5/2010 | Pickering |
| 7,733,332 B2 | 6/2010 | Steenwyk et al. |
| 7,761,062 B2 | 7/2010 | Mervine |
| 7,812,712 B2 | 10/2010 | White et al. |
| 7,821,541 B2 | 10/2010 | Delean |
| 7,859,413 B2 | 12/2010 | Nguyen |
| 7,876,197 B2 | 1/2011 | Ehrman et al. |
| 7,876,201 B2 | 1/2011 | Bauchot et al. |
| 7,898,388 B2 | 3/2011 | Ehrman et al. |
| 7,911,320 B2 | 3/2011 | Ehrman et al. |
| 7,949,541 B2 | 5/2011 | McGinn et al. |
| 7,953,618 B2 | 5/2011 | Pearce et al. |
| 7,956,730 B2 | 6/2011 | White et al. |
| 8,049,602 B2 | 11/2011 | Bauer et al. |
| 8,068,011 B1 | 11/2011 | Sajadi et al. |
| 8,082,164 B2 | 12/2011 | Kakuta et al. |
| 8,095,422 B2 | 1/2012 | Hallowell et al. |
| 8,230,362 B2 | 7/2012 | Couch |
| 8,280,791 B2 | 10/2012 | Davis, III et al. |
| 8,370,268 B2 | 2/2013 | Ehrman et al. |
| 8,463,487 B2 | 6/2013 | Nielsen et al. |
| 8,473,148 B2 | 6/2013 | Nielsen et al. |
| 8,565,963 B2 | 10/2013 | Burke, Jr. |
| 8,671,063 B2 | 3/2014 | Ehrman et al. |
| 8,676,670 B2 | 3/2014 | Ehrman et al. |
| 8,725,596 B2 | 5/2014 | Ehrman et al. |
| 8,768,565 B2 | 7/2014 | Jefferies et al. |
| 9,129,336 B2 | 9/2015 | Ehrman |
| 9,373,201 B2 | 6/2016 | Jefferies et al. |
| 10,515,489 B2 | 12/2019 | Jefferies et al. |
| 11,037,375 B2 | 6/2021 | Jefferies et al. |
| 2001/0000957 A1 | 5/2001 | Birchfield et al. |
| 2001/0028295 A1 | 10/2001 | Brinkmeyer et al. |
| 2001/0056361 A1 | 12/2001 | Sendouda |
| 2001/0056363 A1 | 12/2001 | Gantz et al. |
| 2002/0008645 A1 | 1/2002 | Flick et al. |
| 2002/0022979 A1 | 2/2002 | Whipp et al. |
| 2002/0027498 A1 | 3/2002 | Stephane |
| 2002/0030105 A1 | 3/2002 | Miller et al. |
| 2002/0121962 A1 | 9/2002 | Wolfe |
| 2002/0130765 A1 | 9/2002 | Flick |
| 2002/0186144 A1 | 12/2002 | Meunier |
| 2002/0197988 A1 | 12/2002 | Hellaker |
| 2003/0034873 A1 | 2/2003 | Chase et al. |
| 2003/0087636 A1 | 5/2003 | Mazzara et al. |
| 2003/0107469 A1 | 6/2003 | Emmerling |
| 2003/0120522 A1 | 6/2003 | Uyeki |
| 2003/0125961 A1 | 7/2003 | Janda |
| 2003/0182033 A1 | 9/2003 | Underdahl et al. |
| 2003/0182054 A1 | 9/2003 | Peterson et al. |
| 2003/0182183 A1 | 9/2003 | Pribe |
| 2003/0191568 A1 | 10/2003 | Breed |
| 2003/0222758 A1 | 12/2003 | Willats et al. |
| 2004/0006498 A1 | 1/2004 | Ohtake et al. |
| 2004/0009772 A1 | 1/2004 | Mazzara |
| 2004/0012501 A1 | 1/2004 | Mazzara et al. |
| 2004/0024621 A1 | 2/2004 | Read |
| 2004/0044454 A1 | 3/2004 | Ross et al. |
| 2004/0044592 A1 | 3/2004 | Ubik et al. |
| 2004/0049324 A1 | 3/2004 | Walker |
| 2004/0049424 A1 | 3/2004 | Murray et al. |
| 2004/0073340 A1 | 4/2004 | Ueda et al. |
| 2004/0073440 A1 | 4/2004 | Garbers et al. |
| 2004/0094621 A1 | 5/2004 | LaMont |
| 2004/0122688 A1 | 6/2004 | Janda |
| 2004/0158483 A1 | 8/2004 | Lecouturier |
| 2004/0176969 A1 | 9/2004 | Fujinuma |
| 2004/0193440 A1 | 9/2004 | Mawatari |
| 2004/0203696 A1 | 10/2004 | Jijina et al. |
| 2004/0203969 A1 | 10/2004 | Videtich |
| 2004/0225544 A1 | 11/2004 | Camer |
| 2004/0230498 A1 | 11/2004 | Zimmerman et al. |
| 2004/0242198 A1 | 12/2004 | Oyagi et al. |
| 2004/0249818 A1 | 12/2004 | Isaac |
| 2005/0033484 A1 | 2/2005 | Geber et al. |

(56) References Cited

U.S. PATENT DOCUMENTS

| | | |
|---|---|---|
| 2005/0038598 A1 | 2/2005 | Oesterling et al. |
| 2005/0050017 A1 | 3/2005 | Ross et al. |
| 2005/0060070 A1 | 3/2005 | Kapolka et al. |
| 2005/0064895 A1 | 3/2005 | Oesterling et al. |
| 2005/0065678 A1 | 3/2005 | Smith et al. |
| 2005/0085221 A1 | 4/2005 | Sumcad |
| 2005/0096939 A1 | 5/2005 | Ramseyer |
| 2005/0099262 A1 | 5/2005 | Childress et al. |
| 2005/0108089 A1 | 5/2005 | Ehrman et al. |
| 2005/0116816 A1 | 6/2005 | Nitou |
| 2005/0125483 A1 | 6/2005 | Bergander et al. |
| 2005/0146465 A1 | 7/2005 | Prassmayer et al. |
| 2005/0159988 A1 | 7/2005 | Ramseyer |
| 2005/0200479 A1 | 9/2005 | James |
| 2005/0209746 A1 | 9/2005 | Kish et al. |
| 2005/0216296 A1 | 9/2005 | Kokubu |
| 2005/0225429 A1 | 10/2005 | Burzio |
| 2005/0250440 A1 | 11/2005 | Zhou et al. |
| 2005/0256762 A1 | 11/2005 | Dar et al. |
| 2005/0261035 A1 | 11/2005 | Groskreutz et al. |
| 2006/0031011 A1 | 2/2006 | Oesterling et al. |
| 2006/0038674 A1 | 2/2006 | Sumcad et al. |
| 2006/0047373 A1 | 3/2006 | Sumcad et al. |
| 2006/0066439 A1 | 3/2006 | Keeling et al. |
| 2006/0072756 A1 | 4/2006 | Leimgruber et al. |
| 2006/0082471 A1 | 4/2006 | Rockett et al. |
| 2006/0114101 A1 | 6/2006 | Schambeck et al. |
| 2006/0118622 A1 | 6/2006 | Zatloukal et al. |
| 2006/0125620 A1 | 6/2006 | Smith et al. |
| 2006/0132291 A1 | 6/2006 | Dourney et al. |
| 2006/0154643 A1 | 7/2006 | Scholz et al. |
| 2006/0157563 A1 | 7/2006 | Marshall |
| 2006/0158319 A1 | 7/2006 | Kim |
| 2006/0173587 A1 | 8/2006 | Oesterling et al. |
| 2006/0178949 A1 | 8/2006 | McGrath |
| 2006/0186988 A1 | 8/2006 | Proefke et al. |
| 2006/0194566 A1 | 8/2006 | Oesterling |
| 2006/0202799 A1 | 9/2006 | Zambo et al. |
| 2006/0214767 A1 | 9/2006 | Carrieri |
| 2006/0229780 A1 | 10/2006 | Underdahl et al. |
| 2006/0244588 A1 | 11/2006 | Hannah et al. |
| 2006/0258379 A1 | 11/2006 | Oesterling et al. |
| 2006/0259353 A1 | 11/2006 | Gutmann |
| 2006/0265117 A1 | 11/2006 | Cahoon |
| 2006/0293802 A1 | 12/2006 | Kitao et al. |
| 2007/0021054 A1 | 1/2007 | Videtich |
| 2007/0026876 A1 | 2/2007 | Freilich |
| 2007/0055415 A1 | 3/2007 | Taki et al. |
| 2007/0061069 A1 | 3/2007 | Christensen |
| 2007/0093943 A1 | 4/2007 | Nelson et al. |
| 2007/0139182 A1 | 6/2007 | O'Connor et al. |
| 2007/0152877 A1 | 7/2007 | Madhaven et al. |
| 2007/0173992 A1 | 7/2007 | McCutchen et al. |
| 2007/0179706 A1 | 8/2007 | McCutchen et al. |
| 2007/0179798 A1 | 8/2007 | Inbarajan |
| 2007/0179799 A1 | 8/2007 | Laghrari |
| 2007/0179800 A1 | 8/2007 | Oesterling |
| 2007/0191995 A1 | 8/2007 | Laghrari |
| 2007/0197194 A1 | 8/2007 | Oyagi et al. |
| 2007/0198276 A1 | 8/2007 | Hinrichs et al. |
| 2007/0200671 A1 | 8/2007 | Kelley et al. |
| 2007/0203618 A1 | 8/2007 | McBride et al. |
| 2007/0210896 A1 | 9/2007 | Schambeck et al. |
| 2007/0216572 A1 | 9/2007 | Schnabel |
| 2007/0222292 A1 | 9/2007 | Shimomura |
| 2007/0222293 A1 | 9/2007 | Shimomura |
| 2007/0241862 A1 | 10/2007 | Dimig et al. |
| 2007/0250232 A1 | 10/2007 | Dourney et al. |
| 2007/0275690 A1 | 11/2007 | Hunter et al. |
| 2007/0288127 A1 | 12/2007 | Haq et al. |
| 2007/0290789 A1 | 12/2007 | Segev et al. |
| 2008/0012762 A1 | 1/2008 | James |
| 2008/0014908 A1 | 1/2008 | Vasant |
| 2008/0015908 A1 | 1/2008 | Ramseyer |
| 2008/0021605 A1 | 1/2008 | Huber et al. |
| 2008/0027604 A1 | 1/2008 | Oesterling |
| 2008/0027606 A1 | 1/2008 | Helm |
| 2008/0039995 A1 | 2/2008 | Reeser |
| 2008/0048844 A1 | 2/2008 | Watanabe et al. |
| 2008/0065678 A1 | 3/2008 | Petri |
| 2008/0074234 A1 | 3/2008 | Nelson |
| 2008/0091342 A1 | 4/2008 | Assael |
| 2008/0129545 A1 | 6/2008 | Johnson et al. |
| 2008/0133432 A1 | 6/2008 | Ramseyer |
| 2008/0140544 A1 | 6/2008 | Ehrman et al. |
| 2008/0140570 A1 | 6/2008 | Vaughn |
| 2008/0154671 A1 | 6/2008 | Delk |
| 2008/0161981 A1 | 7/2008 | Tessier et al. |
| 2008/0228365 A1 | 9/2008 | White et al. |
| 2008/0238690 A1 | 10/2008 | Plant |
| 2008/0270019 A1 | 10/2008 | Anderson et al. |
| 2009/0015373 A1 | 1/2009 | Kelly et al. |
| 2009/0055936 A1 | 2/2009 | Eberstaller |
| 2009/0096576 A1 | 4/2009 | Oman et al. |
| 2009/0099897 A1 | 4/2009 | Ehrman et al. |
| 2009/0140846 A1 | 6/2009 | Rutledge |
| 2009/0212978 A1 | 8/2009 | Ramseyer |
| 2009/0278656 A1 | 11/2009 | Lopez et al. |
| 2009/0287499 A1 | 11/2009 | Link, II |
| 2010/0001830 A1 | 1/2010 | Woo |
| 2010/0078475 A1 | 4/2010 | Lin et al. |
| 2010/0094482 A1 | 4/2010 | Schofield et al. |
| 2010/0137024 A1 | 6/2010 | Maguire |
| 2010/0211401 A1 | 8/2010 | Williams et al. |
| 2010/0305779 A1 | 12/2010 | Hassan et al. |
| 2011/0022422 A1 | 1/2011 | Taylor |
| 2011/0040692 A1 | 2/2011 | Ahroon |
| 2011/0060480 A1 | 3/2011 | Mottla et al. |
| 2011/0112717 A1 | 5/2011 | Resner |
| 2011/0112969 A1 | 5/2011 | Zaid et al. |
| 2011/0137520 A1 | 6/2011 | Rector et al. |
| 2011/0191126 A1 | 8/2011 | Hampshire et al. |
| 2011/0202393 A1 | 8/2011 | DeWakar et al. |
| 2011/0213629 A1 | 9/2011 | Clark et al. |
| 2011/0225269 A1 | 9/2011 | Yap et al. |
| 2011/0231354 A1 | 9/2011 | O'Sullivan et al. |
| 2011/0281562 A1 | 11/2011 | Videtich |
| 2011/0282717 A1 | 11/2011 | Aschenbrenner et al. |
| 2011/0288891 A1 | 11/2011 | Zaid et al. |
| 2011/0313893 A1 | 12/2011 | Weik, III |
| 2012/0019360 A1 | 1/2012 | McGinn et al. |
| 2012/0062366 A1 | 3/2012 | Pappu et al. |
| 2012/0105197 A1 | 5/2012 | Kobres |
| 2013/0035846 A1 | 2/2013 | Shih-Chia et al. |
| 2013/0080196 A1 | 3/2013 | Schroeder et al. |
| 2013/0080345 A1 | 3/2013 | Rassi |
| 2013/0082820 A1 | 4/2013 | Tieman |
| 2013/0144667 A1 | 6/2013 | Ehrman et al. |
| 2013/0317693 A1 | 11/2013 | Jefferies et al. |
| 2014/0052501 A1 | 2/2014 | Dickson et al. |
| 2014/0156111 A1 | 6/2014 | Ehrman |
| 2014/0156138 A1 | 6/2014 | Klaff et al. |
| 2014/0236645 A1 | 8/2014 | Aaron et al. |
| 2014/0266594 A1 | 9/2014 | Reiser |
| 2014/0278555 A1 | 9/2014 | Johnson et al. |
| 2014/0278599 A1 | 9/2014 | Reh et al. |
| 2014/0278607 A1 | 9/2014 | Johnson et al. |
| 2014/0278608 A1 | 9/2014 | Johnson et al. |
| 2014/0297097 A1 | 10/2014 | Hurwitz |
| 2014/0309842 A1 | 10/2014 | Jefferies et al. |
| 2015/0019304 A1 | 1/2015 | Vakili |
| 2015/0286881 A1 | 10/2015 | Chen et al. |

FOREIGN PATENT DOCUMENTS

| | | |
|---|---|---|
| JP | 2009176261 A | 8/2009 |
| WO | 199305987 A1 | 4/1993 |
| WO | 199851548 A1 | 11/1998 |
| WO | 2004056621 A1 | 7/2004 |
| WO | 2011147893 A1 | 12/2011 |

(56) References Cited

FOREIGN PATENT DOCUMENTS

| WO | 2011159331 A1 | 12/2011 |
|---|---|---|
| WO | 2014152916 A2 | 9/2014 |

OTHER PUBLICATIONS

Doerfler, et al., "Advanced Securirty Systems", VDI-Berichte, 1994, pp. 693-705, vol. /Issue 1 (1152).
http://www.cellocator.com/applications-solutions/lease-rental-cars/, dated Sep. 1, 2012.
http://www.convadis.ch/pages/en/home.php, dated Sep. 1, 2012.
http://www.invers.com/en-eu/, dated Sep. 1, 2012.
International Preliminary Report on Patentability (Chapert I) for PCT/US2013/042305 dated Dec. 4, 2014.
International Search Report and Written Opinion for Application No. PCT/US2013/042305 (GIT.001WO), dated Aug. 29, 2013.
Office Action EP Application 13727479.1 dated Jul. 1, 2019.
Office Action for U.S. Appl. No. 13/840,711 dated Nov. 5, 2015.
Office Action for U.S. Appl. No. 16/725,883 dated Sep. 24, 2020.
Prosecution History for U.S. Appl. No. 13/830,754, now U.S. Pat. No. 8,768,565, filed Mar. 14, 2013.
Prosecution History for U.S. Appl. No. 14/315,586 now U.S. Pat. No. 9,373,201 filed Jun. 26, 2014.
Prosecution History for U.S. Appl. No. 15/652,129, now U.S. Pat. No. 10,515,489, filed Jul. 17, 2017.
Summons to attend oral proceedings, App. No. 13 727 479.1 dated Feb. 28, 2020.
European Search Report for EP Application 21194100.0 dated Feb. 24, 2022.

RENTAL/CAR-SHARE VEHICLE ACCESS AND MANAGEMENT SYSTEM AND METHOD

CROSS-REFERENCE AND PRIORITY CLAIM TO RELATED APPLICATIONS

This patent application is a continuation of U.S. Ser. No. 16/725,883 filed on Dec. 23, 2019, now U.S. Pat. No. 11,037,375, which is a continuation of U.S. Ser. No. 15/652,129 filed on Jul. 17, 2017, now U.S. Pat. No. 10,515,489, which is a continuation in part of U.S. patent application Ser. No. 15/154,389, filed on May 13, 2016, now U.S. Pat. No. 9,710,975, which is a continuation of U.S. patent application Ser. No. 14/315,586, filed on Jun. 26, 2014, now U.S. Pat. No. 9,373,201, which is a continuation of U.S. patent application Ser. No. 13/830,754, filed Mar. 14, 2013, now U.S. Pat. No. 8,768,565, which claims priority to U.S. provisional patent application Ser. No. 61/650,483, filed May 23, 2012, the entire disclosures of each of which being incorporated herein by reference.

BACKGROUND

Technical Field

This invention relates generally to vehicle management systems and methods and, more particularly, to a Rental/CarShare (RCS) vehicle access and management system and method for use and installation.

Description of the Related Art

Currently, RCS companies utilize a vehicle management system that includes several hardware modules that are mounted in the RCS vehicle in order to manage a fleet of RCS vehicles. Such modules are usually connected through the Internet to a remote server containing a vehicle database, a customer registration web based interface, and a billing system.

The RCS ideal business model requires its vehicles be in service for approximately 12 months. However, currently, the RCS vehicles are rolled over every 18 to 24 months due to the high labor cost of removing the hardware and re-installing it in a new vehicle, which typically costs about $85 to remove and $285 to re-install. Thus, the expense and time intensive installation and transfer process of vehicle management hardware is a significant burden on RCS companies. In addition, current hardware to support a management system may be expensive, due to sophisticated hardware and expensive RFID readers, and draw too much power.

SUMMARY

Some embodiments of methods and systems in this disclosure overcome the aforementioned problems and are distinguished over the prior art by, among other novel features, an RCS vehicle access and management system and method for use in the RCS industry that utilizes a controller area network (CAN) bus interface, QR and/or Bar code, RFID/NFC auto detect read/writer, GPS, automatic configuration, and a mobile app coupled with a wireless network that enables the RCS company to monitor and configure the vehicle.

These preferences also enable customers to bypass the reservation desk and pickup/drop off reserved and non-reserved RCS vehicles using a QR/Bar code, RFID card and/or NFC enabled mobile phone coupled with a mobile app. A single control module may include a host processing unit with a processor, an accelerometer, data storage, a GPS chipset with antenna; a PCB mounted wireless (cellular) modem and antenna, and CAN bus transceivers (controller area network) connected with the processor, and a USB programmable interface. The control module may plug into the OBD2 (on-board diagnostics) port of the RCS vehicle. In some embodiments, the RFID/NFC read/write module may be mounted in an accessible location within the driver's compartment. The onboard control module may be connected by a wireless portal to a remote server or servers. These servers may contain, among other functionality, a vehicle database, a customer mobile device interface, SMS gateway, email gateway, and a billing system. Customers and installers may access the system with a variety of methods, including QR code readers, RFID cards, or NFC enabled mobile communication devices. Smartphones, tablets, and/or laptops may interact with the RCS control module by downloading a mobile app configured for such interaction.

Another feature and advantage of some embodiments is that they provide a method of remotely identifying a specific customer and verifying a reservation or use of a specific RCS vehicle for a predetermined period of time.

Another feature and advantage of some embodiments is that they provide a method of remotely gathering vehicle data and searching the national vehicle recall database and displaying that specific vehicle's recall information (recall notice, repair status; repaired/not repaired) on a mobile device.

Another feature and advantage of some embodiments is that they provide a method of digitally controlling electro-mechanical functions (enable/disable starter, door lock/unlock, flash lights, open/close windows, open/close sunroof, sound horn, pop trunk, etc.) through the vehicle's CAN Bus network; reducing the installation time (direct OBD2 plug connection versus hardwiring each control wire to each electromechanical function within the vehicle. This reduces the installation time (cost) and increases reliability.

Another feature and advantage of some embodiments is that they provide a method of monitoring, storing and reporting vehicle diagnostics (MTh (malfunction indicator light) such as a "check engine light), airbag deployed, battery level, etc.), mileage, telltale (e.g., a dashboard indicator such as lights that identify status for blinkers, parking brake, cruise control, etc.), speed, location, route driven, geofence, hard/extreme braking and acceleration (onboard accelerometer) in relation to a specific customers use of a specific RCS vehicle.

Another feature and advantage of some embodiments is that they provide a method of dynamically pairing a customer's contact information (e.g., mobile phone number, email address, emergency contact information) to a specific rental/car-share (RCS) vehicle during their rental period and sending emergency alerts (e.g., email, SMS, voice call) to a specific customer's emergency contact list.

Another feature and advantage of some embodiments is that they provide a method of sending user specific emergency alerts (e.g., location, airbag deployed, collision or rollover, accelerometer, diagnostic freeze frame, speed, heading, extreme acceleration/braking for a predetermined period prior to the incident) to a third party emergency dispatch (e.g., 911 or bonded call center) and customers' emergency contacts.

Another feature and advantage of some embodiments is that they provide a method of gathering and updating and storing vehicle specific data (e.g., location, airbag deployed, collision or rollover, accelerometer, diagnostic freeze frame, speed, heading, extreme acceleration/braking) and onboard data (accelerometer) for a predetermined time period (for example: every 15 seconds). Upon a collision or roll over the logged data can be uploaded via a wireless network to a third party or recovered via hard wired connection in order to determine the cause and/or fault of the accident.

Another feature and advantage of some embodiments is that they provide a method of notifying the rental/car-share (RCS) companies of any critical diagnostics and/or mileage based maintenance alerts.

Another feature and advantage of some embodiments is that they provide a method of collecting and storing customer specific vehicle usage data (e.g., fuel level, start/end odometer reading, total miles, hours in use, max/average speed, idle time, start/stop dates and time, carbon foot print, driver rating, etc.) for purposes of billing (e.g., invoice based on hourly usage, mileage or flat day rate). Additional charges or discounts can be applied (e.g., User Based Insurance—UBI) for safe driving and safe driving areas (e.g., Location Based Insurance—LBI) if the vehicle is used in a high or low risk area.

Another feature and advantage of some embodiments is that they provide a method of automatically checking out and billing customers when a RCS vehicle is returned. The charge for the rental period can be dynamically generated based, for example, on time used (e.g., hours, days), miles traveled with additional charges for insurance (based on driver rating and location) and/or fuel (is the tank full; if not, additional charge for the difference—based on fuel tank level).

A further feature and advantage of some embodiments is that they provide a method of enabling the RCS companies to remotely perform location based inventory utilizing a Graphic User Interface (GUI), wireless network and GPS; companies can perform a virtual roll call giving them count and location of all their vehicles and vehicle status (reserved, not reserved, in use, online, offline, miles to next service and DTC status).

A still further feature and advantage of some embodiments is that they provide a method of preloading the rental or fleet vehicle's onboard navigation system with the renter's trip destinations. During the reservation (web based or mobile app) process a renter can select their destinations (trip log) during the rental period; the trip log is stored in the customer's database. When the vehicle is checked out via the QR Code, RFID or NFC, the trip log is downloaded to the RCS control module which uploads the trip log to the onboard navigation system.

Neither this summary nor the following detailed description purports to define the scope of protection. The scope of protection is defined by the claims.

DETAILED DESCRIPTION OF SPECIFIC EMBODIMENTS

Overview

This disclosure illustrates a rental/car-share (RCS) vehicle control module, and other related embodiments. The RCS vehicle control module may be installed in a rental car or carshare vehicle. The RCS vehicle control module may interact with a mobile application, or multiple mobile applications, in order to provide rental and installation services. For example, disclosed herein, in one embodiment, a mobile application may interact with the control module via one or more wireless networks and/or the Internet in order to unlock the doors, install and associate a vehicle control module within a vehicle, make a reservation, access a car with a reservation, and uninstall or transfer a vehicle control module. In some embodiments, the vehicle control module may send information to a mobile application, or other output device, about a detected location for a "last chance" to stop for gas (or other service) prior to arriving at a location. In some embodiments, the disclosure herein describes a method for installing a vehicle control module.

In some embodiments, the vehicle control module may automatically configure itself to interact with its connected vehicle such as to unlock its doors or roll down a window. In some embodiments, the vehicle control module may automatically configure itself to appropriately select the correct CAN bus network in a vehicle in order to accomplish desired functionality.

The terms rental car share (RCS) and RCS vehicle are broad terms that include their ordinary and plain meanings, including, but not limited to, vehicles rented and leased by traditional car rental services such as Budget, Enterprise, Hertz, etc., and are returned to locations usually run by these services. The terms also include vehicles that may be a part of a car share business model, (e.g. ZipCar, etc) where customers may rent cars on the fly throughout a city or location using a member identification system, and need not return the vehicle to a rental service.

Vehicle Control Module

Figure 1:
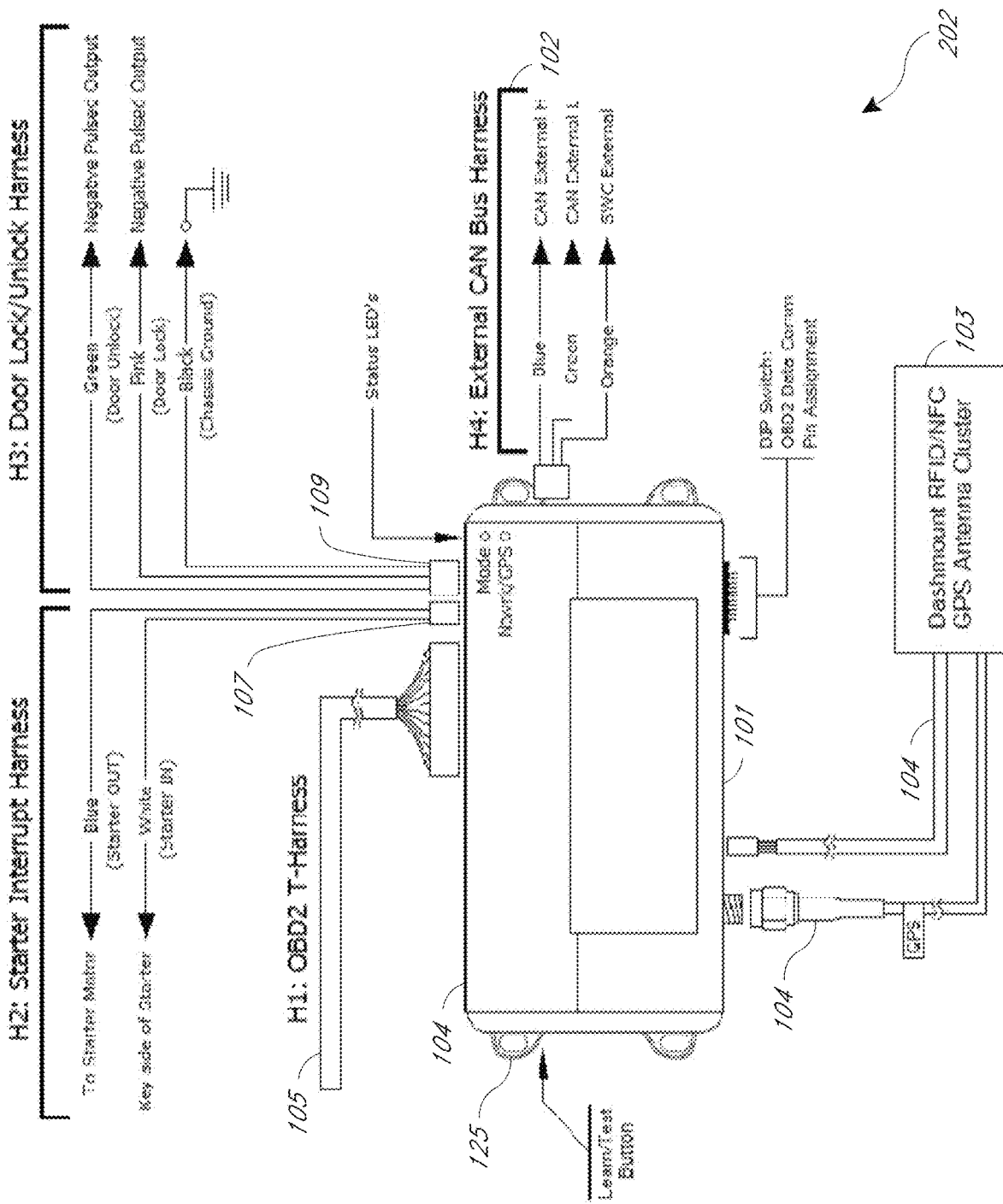
FIG. 1 is a view of the control module as exemplified in one embodiment.
Figure 2:
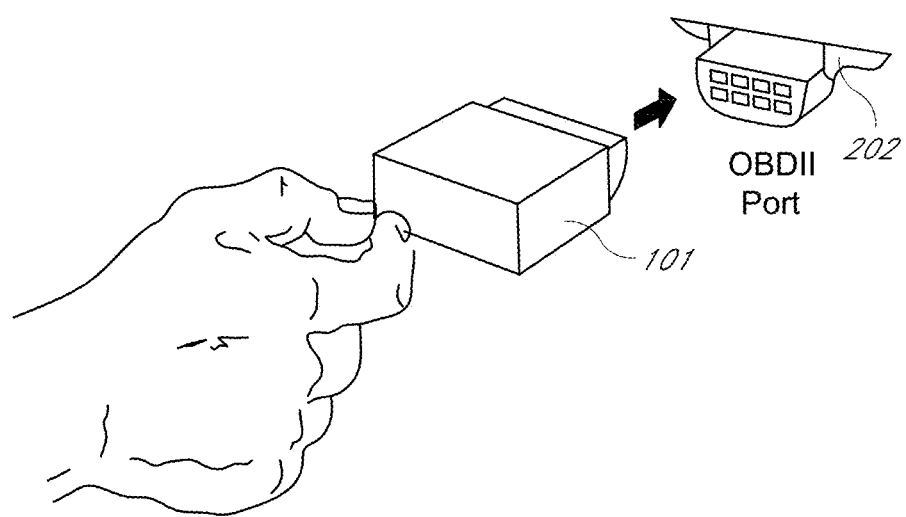
FIG. 2 is a perspective view showing a control module being plugged into the onboard diagnostics module of a rental/car-share (RCS) vehicle.
Figure 3:
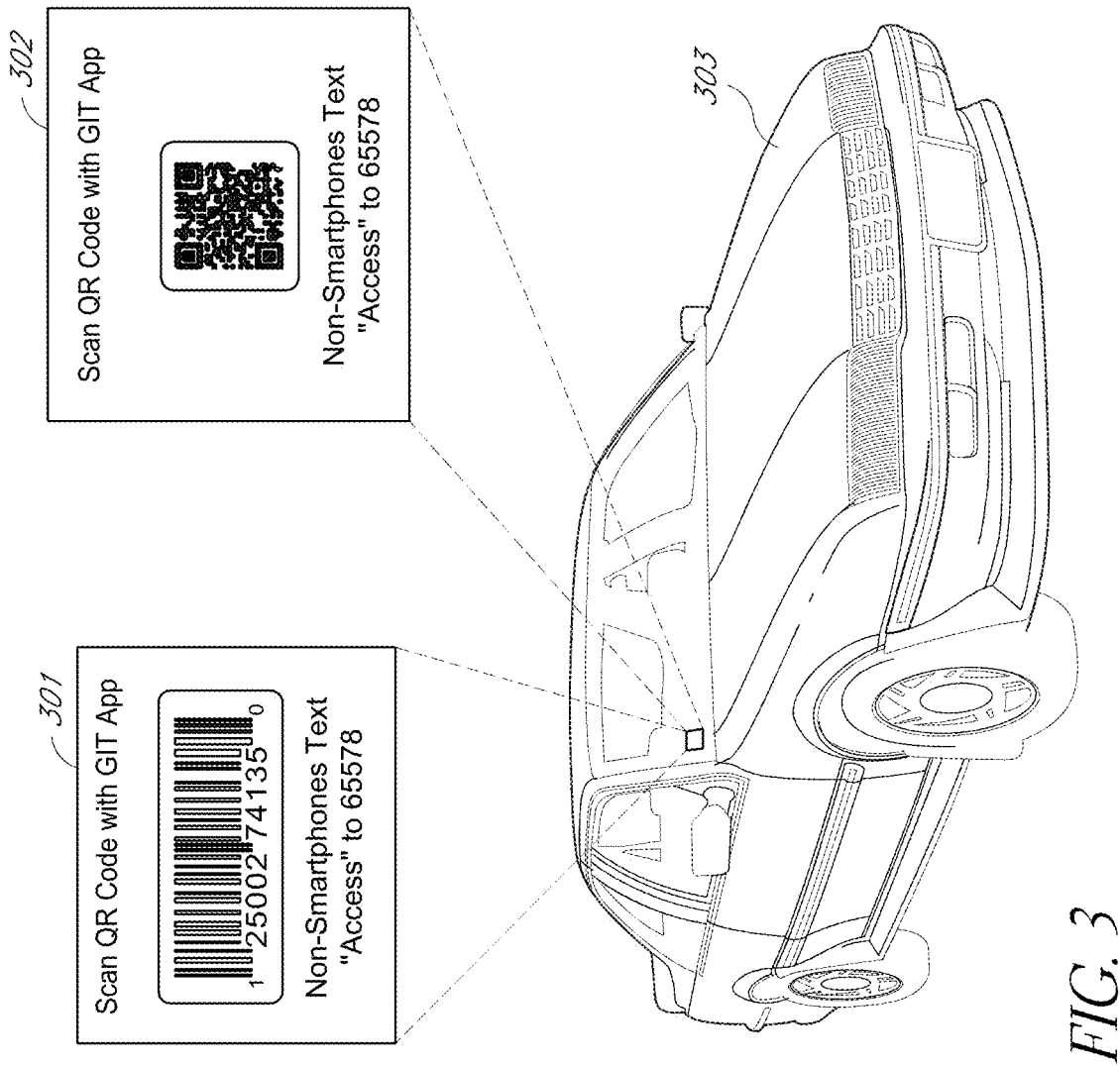
FIG. 3 is a perspective view illustrating a rental/car-share (RCS) vehicle having decals with barcodes and/or QR codes.

Referring now to FIGS. 1, 2, and 3, some embodiments may comprise a hardware module or control module (e.g. vehicle control module 101). The vehicle control module may comprise one or more processors (including, but not limited to, special purpose processors or general processors) that control the vehicle control module. For example, vehicle control module may include one or more processors, and one or more storage devices. The processor(s) may allow the execution of executable computer code capable of instructing the processor to control various aspects of the control module and its related peripherals. It also may allow the execution of computer code configured to interact with other devices in a vehicle, or on the Internet (such as a user with a mobile device, or a server(s) on the Internet). The vehicle module may also comprise one or more storage devices, such as a magnetic disk, memory, cache, or any combination of storage devices. These storage devices may store instructions and/or data required for the operation of the vehicle control module.

A vehicle control module may have a variety of connectors to other related devices and peripherals (in some embodiments, these can be considered part of the vehicle control module). For example, the vehicle control module may connect to an on-board diagnostic unit (e.g. OBD2 port 105), a vehicle starter 107, a door lock/unlock harness 109, an external CAN bus harness 102, and an RFID/NFC communications device 104, among others. Not all of these connections need be used. For example, in some embodiments, the door lock/unlock harness 109 need not be connected to enable functionality to lock and unlock the doors. Instead, in these embodiments, the doors may be unlocked via the connection to the CAN buss 102 by using specialized command codes.

This method of locking and unlocking the doors saves the installer valuable time. It is often difficult to run wires to all of the door locks which are difficult to access in the car. Instead, it is easier to access the CAN bus network to interact with the door locks. In addition, other CAN bus operable devices may be accessed through the same CAN bus interface. The CAN bus may also provide other functionality, such as enable/disable starter, door lock/unlock, flash lights, open/close windows, open/close sunroof, sound horn, pop trunk, etc.

As mentioned above, the connection of the vehicle control module to an on-board diagnostic unit such as an OBD2 port 105 is an example of how the vehicle control module can be connected with a vehicle. It should be understood that other connectors could be used to connect the vehicle control module with the vehicle. The vehicle bus to which the vehicle control module connects can be any communication system that transfers data between components, which may include a variety of hardware components (e.g., wire, optical fiber, etc.) and software, including communication protocols. Any type of connector suitable for connecting the vehicle control module to such a vehicle bus could be used as the vehicle bus connector. Examples of vehicle bus technologies include, but are not limited to, LIN (Local Interconnected Network), FlexRay, MOST (Media Oriented System Transport), CAN (Controller Area Network), CAN-FD (Flexible Data Rate version of CAN), USB (Universal Serial Bus), and/or Ethernet connections as well as improvements upon such vehicle bus technologies or future technologies operating as a vehicle bus technologies. The connection port through which the vehicle control module connects with such vehicle bus technologies can vary as needed for specific cases.

The on-board diagnostic unit may be plugged into the OBD port connection. In some embodiments, this may be an OBD2 connection. As seen in FIG. 2, the RCS vehicle control module (herein known as the "control module") may be plugged into the OBD port 202 of the car. The OBD port may be used to query a wide range of information from the vehicle, including, but not limited to, vehicle information, such as a Vehicle Identification Number (VIN), Calibration Identification, Calibration Verification Number, Electronic Control Unit or Module (ECU and ECM) firmware version. It can also query engine performance measures, such as catalyst counters, the primary oxygen sensor, the evaporating system, EGR system, WT system, secondary air system, secondary oxygen sensor. Other queryable information include vehicle speed, RPMs, odometer, and current fuel level, among others. The OBD port may be connected to other devices that may provide functionality such as enable/disabling the starter, door lock/unlock, flash lights, open/close windows, open/close sunroof, sound horn, pop trunk, etc. While the example embodiment viewed in FIG. 2 shows an OBDII port 202 configured to accept an OBD2 connection, it should be understood that this style and type of connection may be changed in other embodiments as discussed above.

The control module may also be connected to or comprise a GPS antenna 104 and GPS tracking sub-system (internal or external to the control module). Such a subsystem may be configurable to track, using longitude and latitude, the current location of the control module and attached vehicle. This information may be queried from the GPS subsystem and accessed by the control module.

The control module may also comprise, or be connected to, an RFID and/or NFC communications device. RFID (radio-frequency identification) and NFC (near field communication) are methods of querying information from, and communicating with, a radio identification device within a set proximity. While RFID usually operates in one direction, NFC is typically used by smartphones for two way RFID type communication. By connecting to an RFID or NFC communications device, the control module may communicate via RFID or NFC to query identification (or other) information from an installer, car renter, or their devices/smartphones. For example, an installer may use their smartphone to query from the control module a vehicle identifier, or send a user identifier to the control module (other information is also contemplated for communication, other than identifiers).

As describe above, the control module may be associated with one or more identifiers. These identifiers, in addition or separate from being queryable from the control module through RFID, NFC, or wireless networking, may also be available for scan via a bar code or QR code (or any visual representation of the identifier). For example, in FIG. 3, a car with an installed control module appears with a QR code or bar code in the window associated with the CAR and/or control module, or both (it is well known in the art that a bar code or QR code can contain multiple identifiers). This would allow a smartphone application (such as one that is programmed to interact with the phones camera to scan bar codes or QR codes), or any QR or barcode reader to scan the codes and receive the corresponding information, such as control module or vehicle identifiers. This may enable a mobile app with wireless networking capability to use the vehicle or control module identifiers in an installation process, or for a customer to bypass the reservation desk and pickup and drop off reserved RCS vehicles.

In some embodiments, the QR code on the window decal replaces a required RFID reader. This feature significantly reduces hardware and installation costs (by eliminating the expensive RFID and/or NFC hardware) and may maintain security by placing the customer at the vehicle.

In some embodiments, no QR code or RFID/NFC communication is needed. Instead, (and this applies throughout the specification when discussing scanning a QR code for a car), in some embodiments, an installer or customer could photograph the car's license plate or VIN label via the mobile device (e.g. one with a camera). This photo could then be analyzed by the mobile device or the remote servers to extract the VIN or license plate number, the result being input of the vehicle's identifier.

The control module may also include, or be connected to, one or more accelerometers. Accelerometers can be used to measure vehicle acceleration and deceleration. They allow for evaluation of overall vehicle performance and response. This information can then be used to make adjustments to various vehicle subsystems as needed. They can also be used for modeling and detecting events. For example, given a certain abnormal deceleration detected, the control module may determine that the accelerometer detected a vehicle accident. This can be recorded in the control module and/or reported to the driver, the installer, the rental fleet, and/or communicated to a remote server on the Internet. Other events that can be tracked via the accelerometer may include, but are not limited to, unsafe driving habits, vehicle speed, rollover or tilt (e.g. to detect towing) etc. The control module may either calculate these types of events themselves using accelerometer data, or, in the case of more sophisticated accelerometers, be informed of (or have access to) the detected events by the accelerometer.

Figure 4:
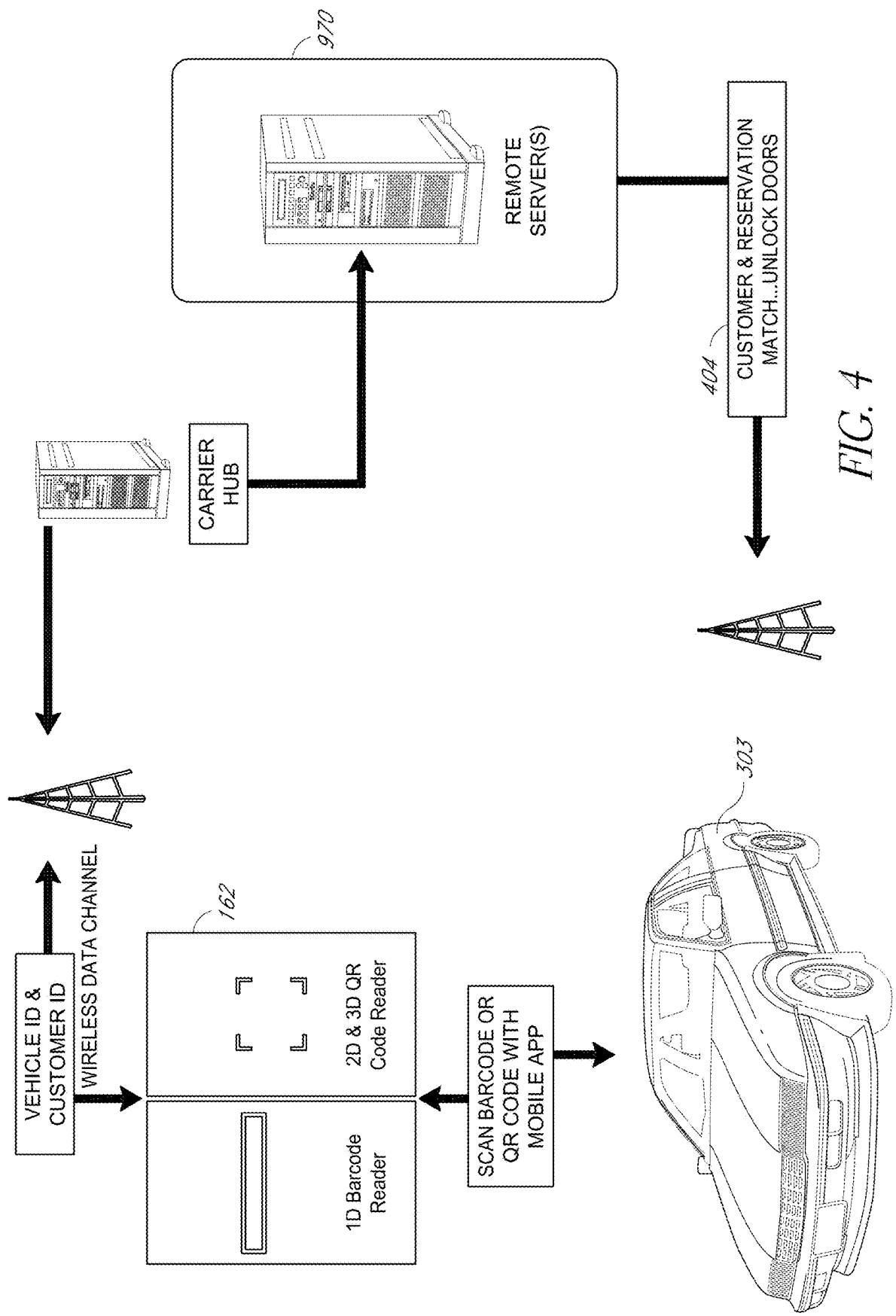
FIG. 4 is a simplified flow diagram of a network illustrating the flow of data between the rental/car-share (RCS) vehicle and one or more servers.

The control module may also include, or be connected to, wireless networking devices. For example, a PCB mounted wireless (cellular) modem with internal antenna (or any type of wireless networking, such as satellite, Wi-Fi, or ad hoc networking) may provide communication with the Internet. For example, the control module may be able to, via the wireless networking device, communicate over a cellular network that connects to the Internet. FIG. 4 describes one example of the communication that is possible using the wireless capabilities of the control module. For example, the onboard control module is connected by a wireless portal to one or more remote server(s) containing a vehicle database, a customer registration mobile device interface, and/or a billing system, among any other features that may be used to manage rental or carshare vehicles. Customers and installers can access the system with a camera equipped mobile communication device such as a mobile phone, tablet or laptop by downloading a mobile app.

Figure 4A:
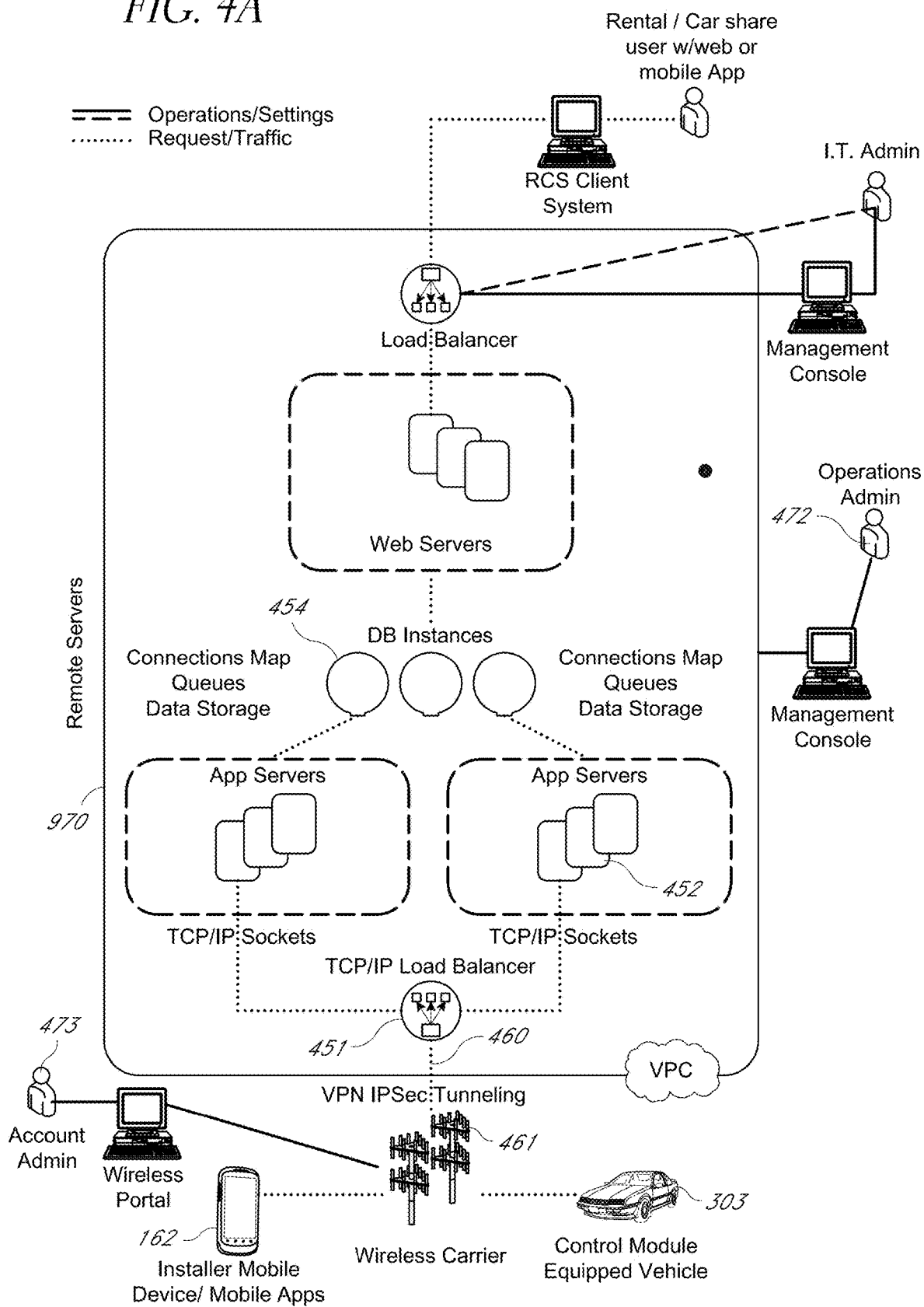
FIG. 4A is a block diagram illustrating example remote servers and network used in management of control modules.

Turning to FIG. 4A, which depicts an example layout of remote computing services for use with the control module, the remote servers may comprise a number of remote computing devices, including load balancers 451, application servers 452, web servers 453, and databases 454. These remote servers may be connected using VPN connections 460 to one or more wireless carriers 461 These can be implemented using dedicated or cloud based servers. A GUI interface to the remote servers may allow an administrator (472, 473) to manage the clients, devices, and control modules via an application, website, or mobile application. In some cases, the remote servers may be known as an RCS gateway. Other configuration of providing remote server services are also contemplated.

To facilitate the transfer of reservation information and telemetric vehicle data between users with authorized access to the control module of the vehicle, the application servers may contain additional security mechanisms to allow or deny such access. The application servers 452 may employ security mechanisms including, but not limited to, an authentication engine, an authorization engine, and an encryption engine. All information entering the remote servers from an originating user or an end user will flow through these engines to verify that such a user is acceptable and registered for access to the control module. Furthermore, as the vehicle bus connector is envisioned to have a universal connector configuration for use in many different vehicle models and with several alternative vehicle bus technologies, the transfer and access to telemetric vehicle data can be protected so that only authorized users can access and obtain such vehicle information. Further still, authentication procedures can be employed to ensure that the control module is authorized to access vehicle information and/or control vehicle functions. An appropriately credentialed control module can then interact with various vehicle components to gain information and control vehicle functions.

The authentication engine of the application servers 452 can be configured to authenticate an information transfer request transmitted by the originating user, or the control module of vehicle, to the end user through the remote servers. Exemplary users may be an account administrator accessing the remote servers through the wireless portal, a user on a mobile application installed on a mobile device, or the control module itself equipped within the vehicle. Communicating through a wireless carrier, these types of originating or end users access the authentication engine of the remote servers when the information transfer request is submitted. Operationally as originating users, these types of users may be attempting to contact another end user through the same wireless carrier or other end users such as operations administrators, information technology administrators, or the RCS client system. In other examples, the operations administrators, information technology administrators or the RCS client system may be the originating users and connect with the remote servers directly to contact the end users or the control module of the vehicle through the wireless carrier. Once an information transfer request is received within the remote servers, the authentication engine performs a systematic analysis of such information to determine the correct identification of the originating user and the end user for the request. Additionally, the authentication engine evaluates whether such an information transfer request is valid. With a positive validation of the information transfer request, the authentication engine submits the information transfer request into the authorization engine for further analysis.

Within the authorization engine, the remote servers confirm the identity of the originating user requesting the information transfer and/or control module. This may be done through authentication credentials such as passwords, key codes, or biometric input data sent along with the information transfer request by the originating user. After the user and/or control module is authenticated, the remote servers can provide credentials such as an encoded authorization certificate to the user and/or control module that controls access to vehicle information and/or vehicle functions. Additionally the authorization engine may verify the identity of the originating user requesting the information transfer from a stored database within the remote servers detailing users previously registered and authorized to communication through the remote servers with end users. Additional information regarding specific instances of how the authentication engine can verify such access may be seen in example embodiments disclosed throughout this application. If the authorization engine calculates that the originating user is an authorized user for communication purposes, the authorized originating user's information transfer request is validated and passed on to the encryption engine of the security mechanisms within the application servers. If it is determined that the originating user requesting the information transfer request is not a valid authorized originating user allowed to transmit or receive such information, the information transfer request will terminate and a notification may be sent to each the originating user and the end user detailing the error of the information transfer request. The notification sent to the originating user may state that the user is not authorized to access the control module of the vehicle or to send and receive information transfer requests through the remote servers. The end user who was to receive the information transfer request may receive a notification stating identification details related to the unauthorized originating user's access attempt including by not limited to the originating user's name, credentials, timestamp of attempted access, and or a location or electronic address of the originating user attempting access. In such situations, unauthorized users attempting to access the remote system may be traced and found for possible remediation by the operators of the remote system to determine and correct and close any possible unauthorized doors or access points into the remote servers.

After a valid authentication is confirmed by the authentication engine, the security mechanisms activate the encryption engine. The encryption engine parses the information request into a first plurality of segments which are then encrypted and reassembled for transmission to the end user of the information transfer request. The encryption engine protects the transmission of electronic messages in this manner so that only the originating user and the end user may access and receive the information transfer request. Unauthorized users or additional users connected to the remote servers will not be able to retrieve or view the encrypted information transfer request as they are not identified by the encryption engine as being authorized originating or end users for accessing the encrypted information. Thus, the encryption engine provides an additional layer of security to transmission of information through the remote servers which may be prone to outside access attempts by illegitimate third parties to obtain both control module information as well as information related to authorized users connected to the remote servers. The end user of the encrypted information will be able to view such information after the end user is authorized to access the remote servers in the same manner stated above in the authentication engine. To view such encrypted information, the computing devices or mobile devices which connect to the remote servers may have decryption technology employed therein allowing the end user to access the complete and true version of the information transfer request. When received by the end user, the encrypted information transfer request is parsed into a second plurality of segments and decrypted in the same manner as the first encryption to retrieve the original information transfer request. Then, the end user may be able to view the original information transfer request on a graphical computing interface of the computing device accessed by the end user. In operational use, each information transfer request flowing through the remote servers are subject to the above described security mechanisms. Given the universal nature of the vehicle bus connector as well as the multitude of users that may connect the remote servers, these security mechanisms provide additional layers of protection as the open market compatibility of the control modules may be employed on various makes, models, years, and types of vehicle designs.

In the example depicted in FIG. 4 renter may be trying to access a rental car. The user's mobile device 162 may be running an application that is capable of reading a QR code on the car that corresponds to the vehicle's identification number (the VIN, or any other number) or corresponds to the control module's identification number. The mobile device 162 or application running on the mobile device, or the customer, may have its own identifier. In this example, the vehicle identifier and a customer identifier may be sent to a remote server via a cellular network and/or the Internet. The remote server may verify that the customer identifier sent is a registered customer with the rental or carshare service, and that customer is allowed to access the identified car. If verification is successful, the remote server may send a command 404 to the control module in the car 303 via the Internet. The control module may receive the command via the Internet over its cellular connection, and unlock the doors, giving car access to the user. The control module's wireless connection security (e.g. the commands sent to the control module, etc.) may be protected using host and network security mechanisms known in the art, such as Authentication, Authorization, and Accounting schemes, including PKI, identifiers/passwords, access control lists, etc.

The remote servers in FIG. 4 that the control module may communicate with may be called remote computing servers, remote computing services, remote servers, remote services, etc. Any type of communication sent or received by the control module is subject to security mechanisms of the authentication engine, authorization engine and encryption engine described above. They may be managed by the rental car share company, the manager or manufacturer of the control modules, or a third party. They may be hosted by a third party hosting service in a location unaffiliated with the rental/car share company of control module manufacturer. Their role is to provide a central repository of vehicle control, and an associated database. For example, programs and data in the servers may allow a user with a mobile device to communicate directly with a control module, even if no RFID, NFC, or any local communication between the control module and the mobile device is established. This may allow for all remote capabilities to be accessed either by a user of the car via their smartphones, or by a remote user (such as an operator assisting a customer with a car). For example, an operator can unlock the car doors for a customer if they have lost their smartphone.

The servers may also keep a number of tables and or associations between the cars, control modules, installers, customers, and others as required by an RCS system. These associations assist with billing and authorization/control of car functionality. For example, there may exist an association within the server (e.g. in a database table) between a vehicle's VIN number and the control module. This assigns the vehicle to the control module, and the control module to the vehicle. Thus, when the control module is sent a command, an embodiment of the invention will know exactly which vehicle is being controlled. When a control module is first installed in a vehicle, this association may be created. When a control module is transferred to another vehicle, this vehicle may be updated to correctly associate the control module to the new vehicle.

There may also exist an association between a user and a control module, or a user and a vehicle (or both). Either association allows for an association to be made between all three using the VIN/control module association described above. This may be created when a user rents a vehicle, or makes a reservation. This allows the allocations of users to vehicles and/or control modules. There may also exist an association between an installer or owner of the RCS fleet, and the control module or vehicle. Again, this allows a program (such as a web program accessible through a GUI) to determine the exact vehicles in the installers/owners fleet, and the exact control modules belonging or associated with the installer/owner. This also allows for permissions to be verified when an installer is creating an association between a vehicle and a control module, because ownership of both the control module and the vehicle may be verified prior to making the VIN/control module association.

These, and many other associations also enable billing to take place. The billing software that uses data stored in the remote servers may use the associations to charge customers or installers/owners, etc. based on the number of control modules they use or are associated with, or the number of vehicles they have rented, or how long those vehicles have been rented, etc.

In addition to these associations, any information accessible by the control module may also be uploaded to these servers for access by an installer, owner, or user (or any manager of the control modules). This data may include, for example, accelerometer information or its results (such as whether there was safe driving or not, or whether an accident occurred, its time/date, etc.), QR Code/RFID/NFC access or communication, starts or stops of the vehicle, its GPS location, door lock or unlock events, etc. Any data accessible by the control module is contemplated.

Installation/Mobile Installation Application

Current methods of installation may be too labor and time intensive (e.g. 1.5 to 2 hours to install). For example, previous systems for unlocking the doors in RCS vehicles require running hardwires to the door lock and unlock motor. Furthermore, previous systems required calibrating a system to current mileage and fuel levels. For example, to calibrate the fuel level (voltage input from fuel gauge) the installer had to 1) turn on the engine with an empty fuel tank to sample the voltage output from the fuel sensor and 2) fill up the gas tank to sample the voltage output when full. After fuel calibration, the installer calibrated the mileage using the Vehicle Speed Sense (VSS) output. This requires the installer to drive the vehicle 2 to 3 times for over a mile each time. The installer then compared the miles driven (vehicle trip log) with the reported mileage from the device. If they were within 1% each trip, the device passes. If not, the device is calibrated and the process is repeated.

In addition, the installer may have to configure a long test and registration process. After hardware install, the installer will call a remote technician and give them the serial number of a RCS system to be tested. The technician will run several tests (to verify connectivity to the network, GPS and send forward commands to the device) to verify the device is installed and functioning. Alternatively, the installer may register the device through a website on a laptop or other desktop and perform similar tests. This may add up to 15 minutes per vehicle, and add considerable cost to a vehicle each time a device is moved from one car to another.

The systems and methods described herein reduce this install time and cost by eliminating the need to calibrate, and streamlining the testing and registrations process (with a possible savings of 50% time). For example, the device does not require calibration because fuel information and mileage information may be requested from a diagnostic unit using the OBD2 port (e.g. a CAN Bus). In some alternative embodiments useful for certain year, makes and models, the control module may request from the odometer a reading over the CAN bus to calculate miles drive.

Prior to installation, but before registration, an installer may use a mobile application (or in a separate mobile application, or web application) to interact with the control module based on scanning the control module for an ID. This ID may then be sent to the remote servers so that the remote servers can issue commands to the control module over the wireless network. The installer may select "test" in the mobile application. The installer application may then test the control module over a variety of criteria, including whether the control module knows its serial number, whether the VIN has been automatically detected correctly, whether the VIN and serial numbers for the control module are correctly paired, whether the vehicle's command codes or executable instructions have been found or downloaded (e.g. Learn Mode Successful). It may also test and display results for GPS signal strength, current address, cellular signal strength, battery voltage, etc. Each of these categories may have a pass or fail display associated with them that indicates whether the vehicle has passed or failed testing. If the vehicle did fail some tests, trouble shooting tips associated with the failed tests may be displayed in the mobile application. If successful, the vehicle may then be registered as described below.

Figure 5:
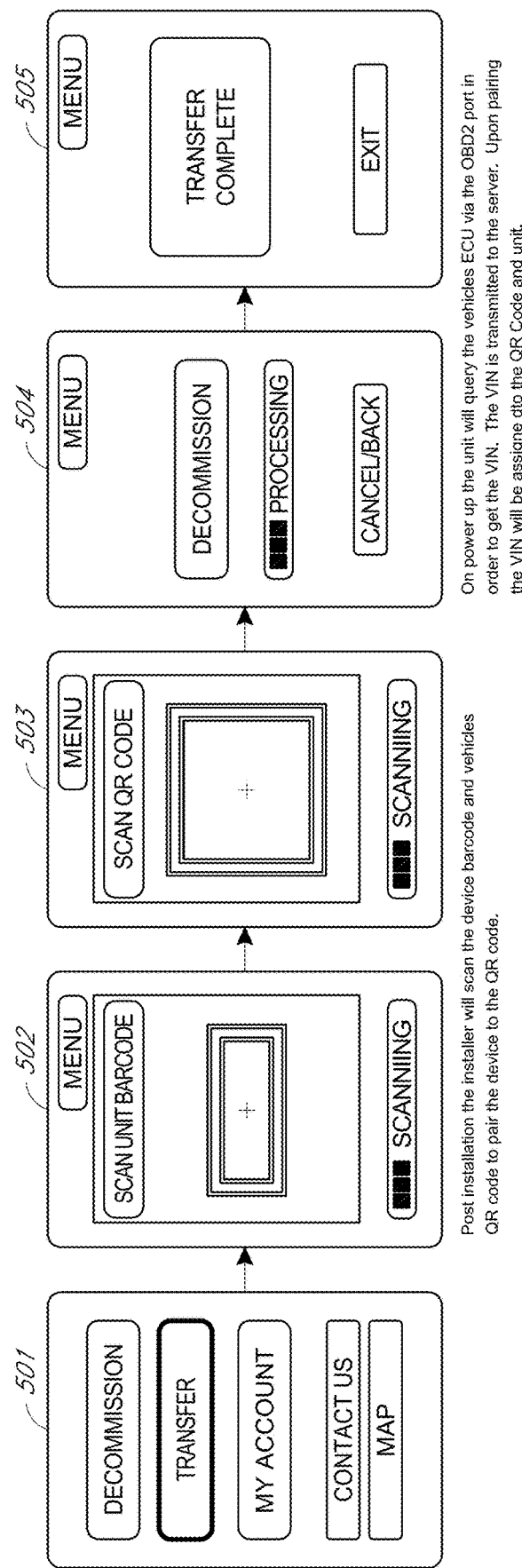
FIG. 5 is a series of exemplary graphic user interfaces, as used in one embodiment, that may be displayed by a mobile app for entering data during the unit commission, install, or reinstall process by an installer.
Figure 5A:
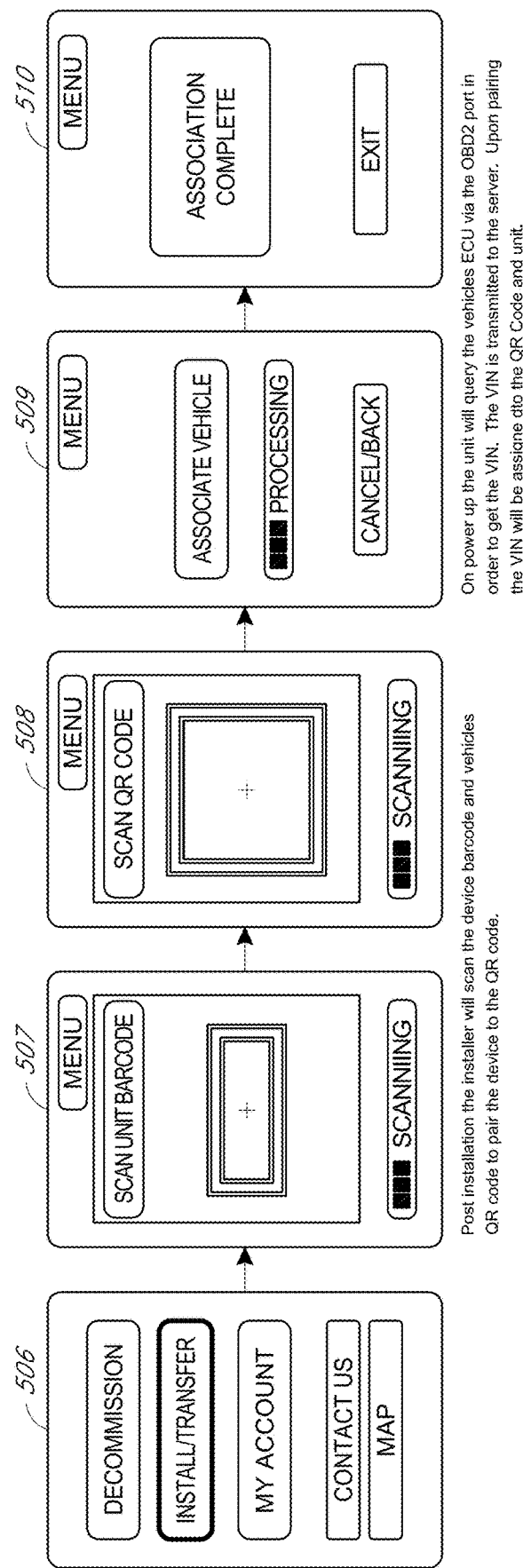
FIG. 5A is a series of exemplary graphic user interfaces, as used in one embodiment, that may be displayed by a mobile app for entering data during the unit commission, install, or reinstall process by an installer.

In one embodiment, the registration process may also be improved. A mobile application may be used to accomplish increased registration efficiency. The following is a brief overview of the mobile application's interaction with the control module in order to install or transfer a control module. The mobile application may be installed on a smartphone, for example, through download of Apple's iTunes service, or any other content distribution mechanism for the mobile device. The installer, after connecting the control module physically with the OBD2 port (or other type of vehicle bus connector) (and possibly other inputs depending on the embodiment) may use the mobile application to initiate an association of the control module. For example, FIGS. 5 and 5A is a series of displays and menus that are shown on the mobile device by the mobile app for entering data during the unit commission (install, FIG. 5A) or transfer (uninstall/reinstall, FIG. 5) process by an installer. The displays are only representative, and may be designed in any manner to carry out the functionality described by the figures and in this specification.

Prior to installation of the control module, the control module may be scanned by an installer after it is pulled from inventory. The module, based on the scan, may be assigned by an operator of the remote server or through the mobile app. In any event, this association between the installer and control module is then stored within the remote servers. In addition, the device may be removed from any "unpaid" or "unassociated" inventory in the remote servers' database. At this point, the device may be picked up or shipped to the installer. In addition, the unit ID may then be sent to the installer's mobile app, so that the mobile app knows which control modules have been assigned to the installer.

Other "inventory" management functionality is also supported through the combination of an installer's mobile app and the remote servers. For example, a control module may be removed from a vehicle for a variety of reasons (e.g. move to another vehicle, returned to inventory, or returned for warranty/repair). To move the device between vehicles, a QR code or bar code may be scanned to get the serial number of the control module. Then, an option to "transfer" or "port" the device may be selected. This will send to the remote servers a command to a listing of control modules available in inventory. This may then be uploaded to the remote servers where it too may mark the device as available/in inventory to be associated with another vehicle. This may cause the control module to be unpaired with any vehicle, and the association between it and any vehicle in the remote servers database (or the installer app) may be removed. The installer may then continue with installation/transfer of the device to the new vehicle. When moved to inventory, a similar process occurs. The control module is unpaired with the vehicle and moved into an available inventory status. For warranty, a similar process occurs, except the control module may be remove from inventory and unassociated with a vehicle.

In some embodiments, when a device is unassociated with a vehicle, the remote servers may alter a billing system so that the rental car company is no longer charged for service on, or rental of, the unused control module until it is later installed in a vehicle. For example, some rental car companies have over a million vehicles, many of which are in a state of transition. Thus, it is contemplated that costs may be reduced for rental car companies if they do not have to pay a monthly wireless service charge (or other charge) for unused control modules.

After installation of the control module, upon power up, the control module will query the vehicle ECU (electronic control unit) via the OBD2 port in order to obtain the Vehicle Identification Number (VIN). The VIN is transmitted to the server. The installer may then launch the mobile application, and select to "install" or "transfer" the control module (501, 506). The mobile app may then present, to the installer, the opportunity to scan (507, 508, 502, 503) the control module barcode and the vehicle QR code in order to pair the control module to the QR code (alternative embodiments may use other identifiers to transfer an identification, such as an RFID, or a visible set of numbers and letters, such as a VIN, that one can input into a mobile device). The two codes may then be sent by the smart phone to the cloud servers via the smart phone's network to confirm association of the control module with the vehicles VIN (which enables association with an installer, a consumer, etc that tracks vehicles) (e.g processing 504, 509). More detail on the method of querying for the VIN is described herein.

Figure 5B:
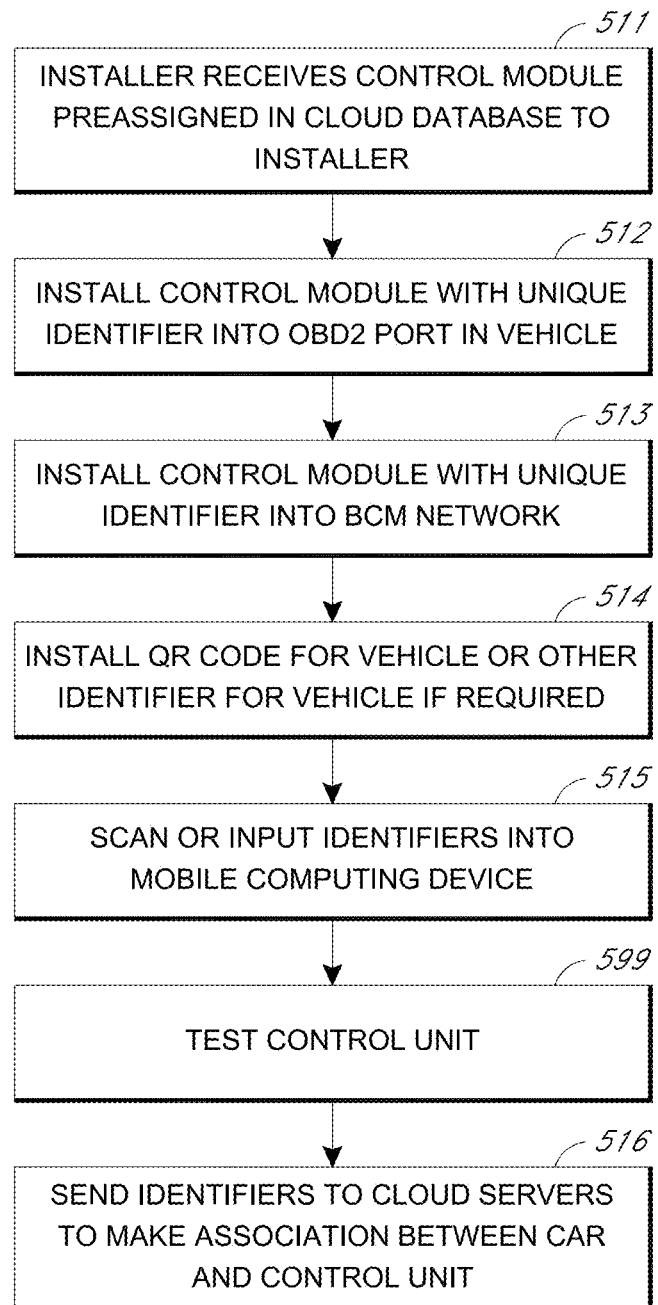
FIG. 5B is a flow chart diagram for an example embodiment illustrating a method of installing and associating a control module within an RCS vehicle.

FIG. 5B illustrates a flow chart diagram corresponding to one method for installing a control module in a vehicle. The method may start with a control module being allocated to a specific installer in the remote servers (511). After the control module is delivered to the installer, or is somehow put into the possession of the installer, the installer may actually place the control module within the car. This usually involves mounting the control module within the car. The control module is then connected to various parts of the car, including connecting the OBD port of the control module to a diagnostics unit 512. The control module may then also be connected to one or more CAN busses 513 (e.g. so as to access a body control module (BCM) that may control various functionality of a vehicle's body). Connecting the control module to a CAN bus may enable the control module to execute a variety of commands for the car, including unlocking the doors or a trunk, controlling lights, chairs, windows, headlights, etc. In some embodiments, the installer may mount a QR code for the vehicle on a window or in any other accessible area 514. At this point the installer may use the mobile app described above and scan the QR or bar codes related to the vehicle and the mobile computing device (514 and 515), or any other method for gathering the identifiers and sending the identifiers to the remote servers for association. For example, in one embodiment, the control module itself may, upon startup of the car, determine the VIN of the car and send the VIN and its own identifier to the remote service via a connected wireless network and/or the Internet. After installation, the control module may be tested 599 (described above), and associated with the vehicle 517 (described above).

In some embodiments, other installation procedures may include mounting an RFID or NFC reader on the car, such as a dashboard, and running a connecting wire to the control module. The installation process may also include connecting the control module to the vehicle's starter, or directly to the vehicle doors (only used if cannot be controlled through external CAN bus). They also may include mounting a cellular and/or GPS antenna on the dashboard and running a similar wire. In some embodiments, a LED status indicator on the control module housing may indicate whether the control module is receiving a signal from either the GPS or cellular (or other wireless) network once turned on.

Once installed and associated with a car, any program or device (such as a mobile device running a mobile application) may be able to communicate with and control the vehicle through the remote service. Any type of communication sent or received can be subject to security mechanisms of the authentication engine, authorization engine and encryption engine in the remote servers. For example, in one embodiment, the remote system may communicate over the Internet with a mobile application that can control the car's functionality after authentication and authorization of the user (such as through a login, where the user is authorized to control the car (e.g. they rented the car), or if the car can tell that the user is in close proximity (e.g. the control module has detected the user, either through a QR/Bar code scan, RFID communication, NFC, or ad hoc wireless networking). At this point, the user may control a variety of functions, depending on its access control, including the list of the following commands: locating the vehicle, such as by sending GPS information back to the user, tracking the vehicle via frequent updates of GPS information, locking or unlocking the doors, unlocking doors for an approved valet, updating a list of RFIDs that are able to access the car (such as approved user RFIDs (e.g. a member of a car share organization), RFIDs associated with maintenance personnel, or a valet), or set settings in the control module, such as for the accelerometer, or to configure whether the control module is tracking mileage.

The control module may also send a variety of data to the user, including car diagnostics, data about a high or low impact crash from the accelerometer, a trip log, including start/end locations, date/time, miles driven, duration of trip, max speed, average speed, max acceleration, fuel level, etc. Other data may include whether extreme acceleration or braking occurred, whether the engine was ever turned on without proper access (unauthorized user), the maximum speed, whether the vehicle has left a certain geographical area, critical diagnostic information (Diagnostic Trouble Code (DTC)) such as whether the car has a low battery or engine coolant, etc., whether the car has been towed or tampered with, and whether maintenance has been performed.

Auto Configuration

As described above, in some embodiments, vehicle manufacturers broadcast digital commands over a vehicles CAN Bus network to control electro-mechanical functions within a vehicle (example: door lock/unlock, arm/disarm OE alarm, trunk release, lights, horn, etc.). The digital commands are unique to each year, make and model; therefore, to control functions within a vehicle the device must be able to determine the vehicles identity in order to load the right command codes.

In some embodiments, a manual process may be used to configure the control module. A person or external computer may determine the vehicles year make and model, and then connect a control module to a PC via USB, log into a web site on the PC, select the year, make and model, and flash the control module with the selected vehicles codes. Or, in the alternative, the control module may monitor the CAN Bus and determine the vehicle based on the transmission protocol.

Advantageously, this configuration may also be performed automatically by the control module. The control module is capable of storing a set of executable instructions or command codes to use to operate the car in its memory or permanent storage. These command codes or executable instructions may be organized in storage and mapped according to their functionality. For example, a table or mapping may exist that cross references a key for the "unlock doors" command with either the storage location for the command code/executable instruction, or the codes/instructions themselves.

Figure 5C:
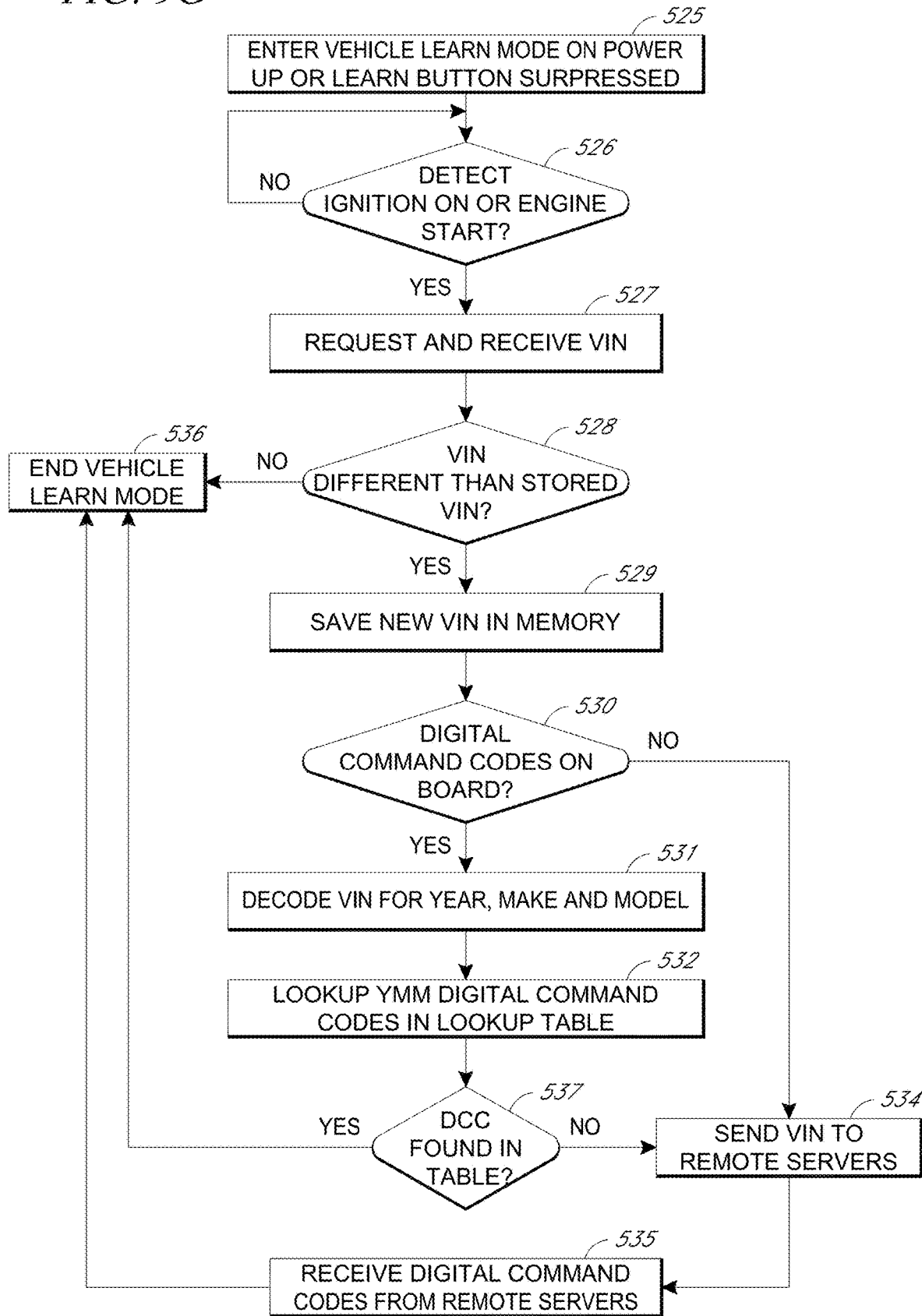
FIG. 5C is a flow chart diagram illustrating example steps for one or more embodiments to auto-configure a control module.

FIG. 5C discloses a method the control module may be automatically configured to perform in order to determine, store, and access specific instructions for a specific vehicle. This method may be performed, for example, on power up (12V supplied to device, e.g., the control module is plugged into OBD or other vehicle bus connector. This may be performed after every power up, after the power up when newly associated with a new vehicle, or if specifically set into "Learn Mode" (e.g. by suppressing an outside button on the control module to reset and relearn its settings, FIG. 1, 125).

In block 525, the device is powered up, or set into reset mode, which may begin the automatic configuration process for learning/looking up the command codes or executable instructions to operate the vehicle.

In block 526, in some embodiments, the control module will detect whether or not the ignition has been turned on or the engine has been started. These may be detected by sensing the starter/ignition interrupt harness, or by querying information via the OBD2 port (or other vehicle bus connector), among other methods. If one or both of these requirements have been met (depending on the embodiment), then the control module may continue on to block 527. However, if the required signal is not detected, then the process may stall until the signal is detected.

In block 527, the control module will request and receive the VIN. This is usually performed by querying the Electronic Control Unit/Module (ECU) through the OBD2 port (or other vehicle bus connector). Once the VIN is received, the received VIN may be compared to a previously stored VIN in block 528. The previously stored VIN may have been received from a prior startup or learning mode operation, for example from the same vehicle or a vehicle that the control module was previously installed in. If the vehicle is the same, and the VINs match, then there is no need to do any auto configuration, and the process may end 536. If the VINs do not match (or if there was no previously stored VIN because this is a new install), then the control module has been placed in a new vehicle and needs to perform auto-configuration to determine the appropriate codes to use to automate the vehicle.

In block 529, the new VIN may be saved in memory. This may, in some embodiments, overwrite the old stored VIN, or may be stored in a new memory location, thus allowing for the control module to record a history of VINs that the control module has been associated with.

Block 530 is meant to represent two alternative embodiments. In one embodiment, a superset of command codes may be stored within the control module in a data store (i.e. magnetic disk, memory, etc). In other embodiments, the appropriate command codes may be retrieved over the wireless network via download, and stored in the control module for future use.

In block 531, if the command codes are stored locally, then the VIN may be analyzed in order to decode the year, make and model of the vehicle. The Vehicle Identification Number (VIN) is 17 digit number encoded with the vehicles year, make and model and can be obtain/requested electronically when connected to the CAN Bus. Code of Federal Regulations contains information on how to decode the VIN. For example, the 1st character may determine where the vehicle was manufactured/assembled. The second two characters of the VIN may determine the manufacturer. The 4th-8th characters may determine the brand, engine, size, and type of vehicle. The 9th character may identify the VIN as being authorized by the manufacturer. The 10th character may provide the model year of the car. The 11th character may indicate which plant assembled the vehicle, and the final 6 characters may contain the serial number of the vehicle. By using this information, in association with a table stored in the control module's data store mapping the various codes contained within the VIN, the make, model, and year may be determined. Once the year, make and model (YMM) is known, the appropriate YMM may be cross referenced with stored command codes or executable instructions for that specific YMM 532. These codes may then be referenced in the appropriate memory location (e.g. as the command table described above for operating the car) for future use on the CAN bus for automated car commands, and the "learn mode" or autoconfiguration may end 536.

In the alternative, (or in the case that the codes for the YMM are not found already stored within the control module 537), the VIN may be instead sent via the wireless network connection to the remote computing system. The remote computing system 534 may then determine the correct codes to use, and transmit them to the control module over the wireless network/Internet. The codes (e.g command codes or executable instructions) may be received 535 by the control module and stored in an appropriate table for use to operate the CAN bus and enable car commands.

Figure 5D:
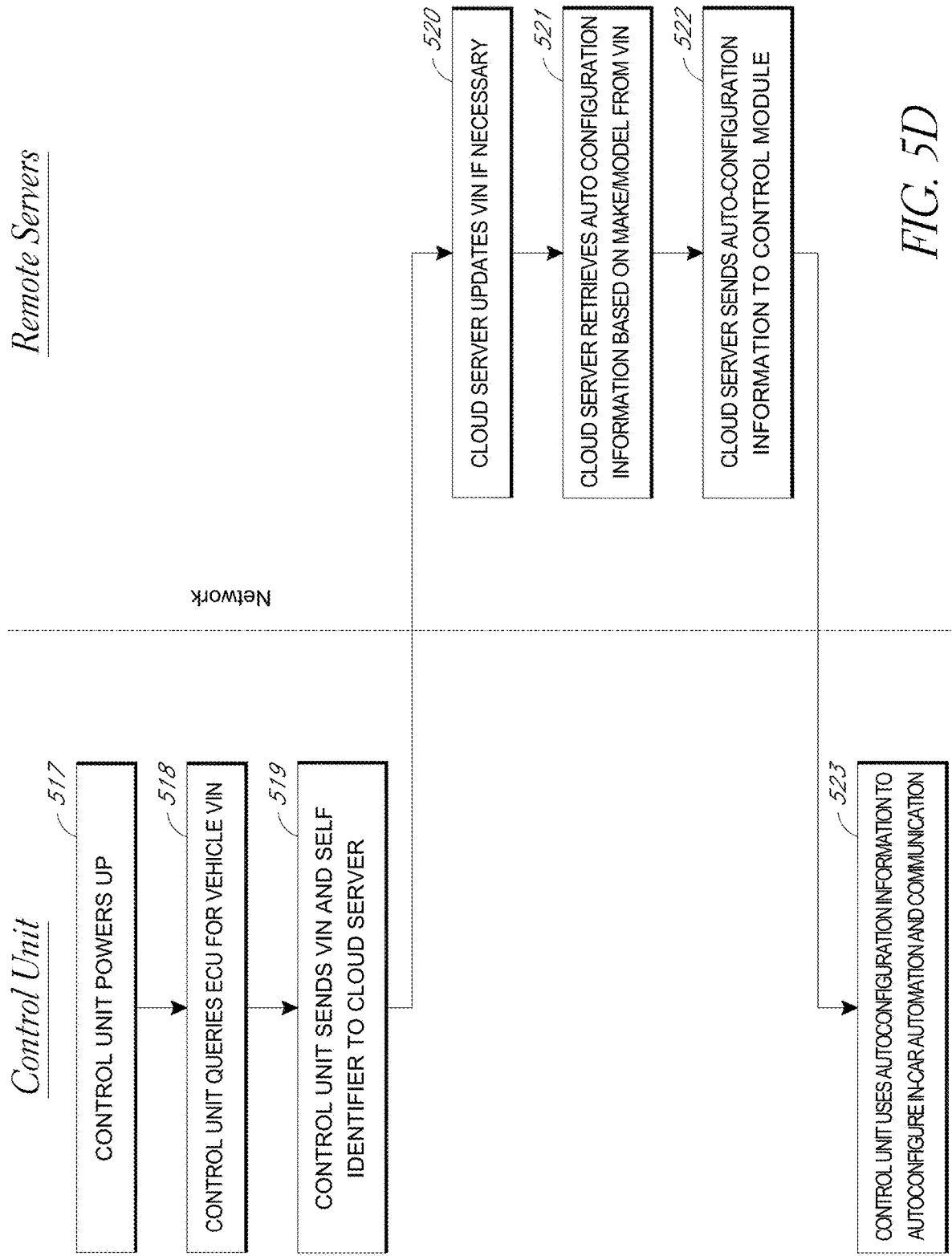
FIG. 5D is a flow chart diagram illustrating example steps for one or more embodiments to auto-configure a control module.

FIG. 5D is a flow chart illustrating how the embodiment that downloads the codes may function. As explained previously, the control module may power up or enter learning mode 517. The control module may then query the ECU via the OBD2 port (or other vehicle bus connector) for the vehicle's VIN 518. The control module then uploads (via the wireless network/Internet) the VIN to the remote servers, and optionally, a self identification code for the control module 519 (or optionally any other useful information for the remote servers to use as authentication/authorization, to verify the pairing between the VIN and the control module).

In block 520, the remote servers may update the VIN if necessary in their database. This may occur if, in some embodiments, the remote servers will update the vehicle associated with the control module based on a new VIN reported by the control module. This may allow a skip of using a mobile application for assigning control modules to vehicles.

In block 521, the remote server may decode the VIN and lookup in its database the correct command codes and/or executable instructions to send to the control module. In 522, the remote server uploads this information to the control module. The control module may then download and store the codes/instructions for lookup, access, and use when executing certain features, such as unlocking the doors, etc.

In some embodiments, autoconfiguration may also involve configuring hardware for communication with a specific CAN bus networks. Different makes (and models) of automobiles utilize different communication buses to achieve similar functions (e.g. unlocking doors, rolling down windows, unlocking the trunk, etc.). This may provide a challenge when designing universal product that is intended to work across all makes and models. This situation actually applies to multiple communication protocols within the vehicle—for example, there are single wire & two wire CAN protocols for vehicle. In the examples presented, the focus is on 2-wire CAN buses, however, the same strategy applies to single wire CAN bus and can be extended to other communication protocols as well.

In some embodiments, installers may require knowledge (available via the install manual or online vehicle lookup or other) of the vehicle and must configure the control module manually to use the appropriate communication bus. This method can be cumbersome and subject to human error. A common implementation is to utilize a dipswitch, which must be set according to the specific vehicle requirements based on the vehicle's type of CAN bus. For example, in some embodiments, the control module may require transmission on at least two CAN bus networks, one for the ECU and another for the Body Control Module (BCM). For the ECU, the OBD2 harness (or other vehicle bus harness) may be used for transmission. For the BCM, the external CAN Bus harness may be used for transmission. However, the installer must configure the DIP switch to isolate the proper communication wires to communicate correctly on the BCM connected CAN bus network.

Figure 5E:
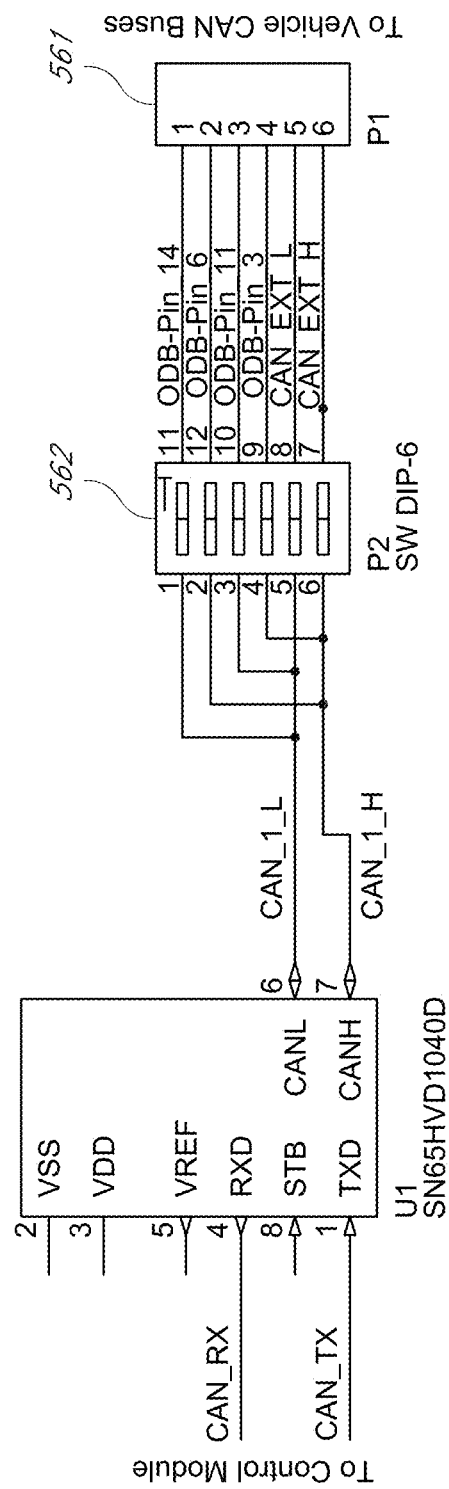
FIG. 5E is a contact layout illustrating a sample embodiment's CAN bus PIN configuration.

FIG. 5E shows a typical implementation. In this figure, component 561 represents the multiple buses—this is an abstraction, as they are not necessarily available on the same connector. Component 562 is a dipswitch that can be configured according to connected vehicle's requirements. One example setting would be having the switch for OBD pins 14 & 6 active (ON), while having the other switches inactive (OFF). In this scenario, only 1 bus may be active at a time to avoid joining multiple buses on the vehicles (which are intended to be separate). The control module in this scenario is not aware of which bus it is connected to.

Figure 5F:
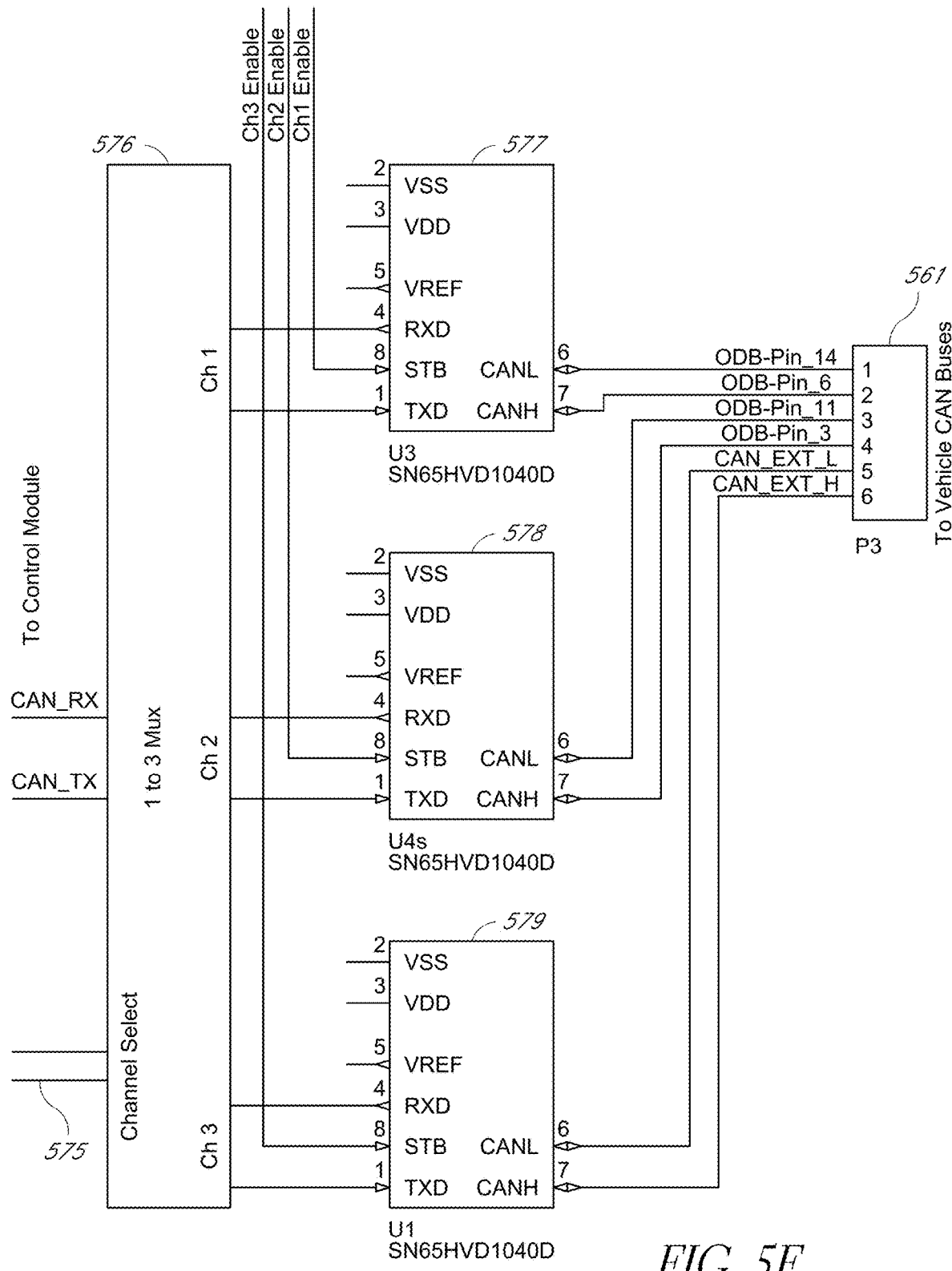
FIG. 5F is a contact layout illustrating a sample embodiment's automatic CAN bus PIN configuration.

FIG. 5F shows one example embodiment of an improved solution that can be auto-configured without the need for DIP switches. A control module would retrieve the vehicle's VIN and utilize this to determine the appropriate communication configuration. The appropriate vehicle configuration can either be stored locally within the control module or be retrieved remotely via various wireless options, such as the described cellular network and Internet connection. Once the configuration is known, the microcontroller would activate the appropriate channel (via channel select pins 575) via a digital multiplexer 576 to enable the appropriate CAN transceiver (transceivers 577, 578, 579 that can be enabled/disabled by the 1 to 3 MUX 576). Thus, this method eliminates the need for the installer to manually configure the module's communication setup (requiring costly time and labor on the part of the installer). This also eliminates the risk of inadvertently joining multiple buses on the vehicle because in this case there can be no common connection point scenarios, which eliminates the chance of joining buses. The 1 to 3 multiplexer 576 routes the digital CAN communications to a single channel that is set via the channel select lines, which are controlled by the control module. Multiplexer 576, such as digital multiplexers, to implement this invention are readily available. In some implementations, the MUX can sit on the vehicle side of the CAN transceiver. This would reduce the number of CAN transceivers from 3 to 1. The vehicle side of the CAN transceiver has unique electrical requirements so common readily available multiplexers would be difficult to use.

Customer Mobile Applications

Figure 6:
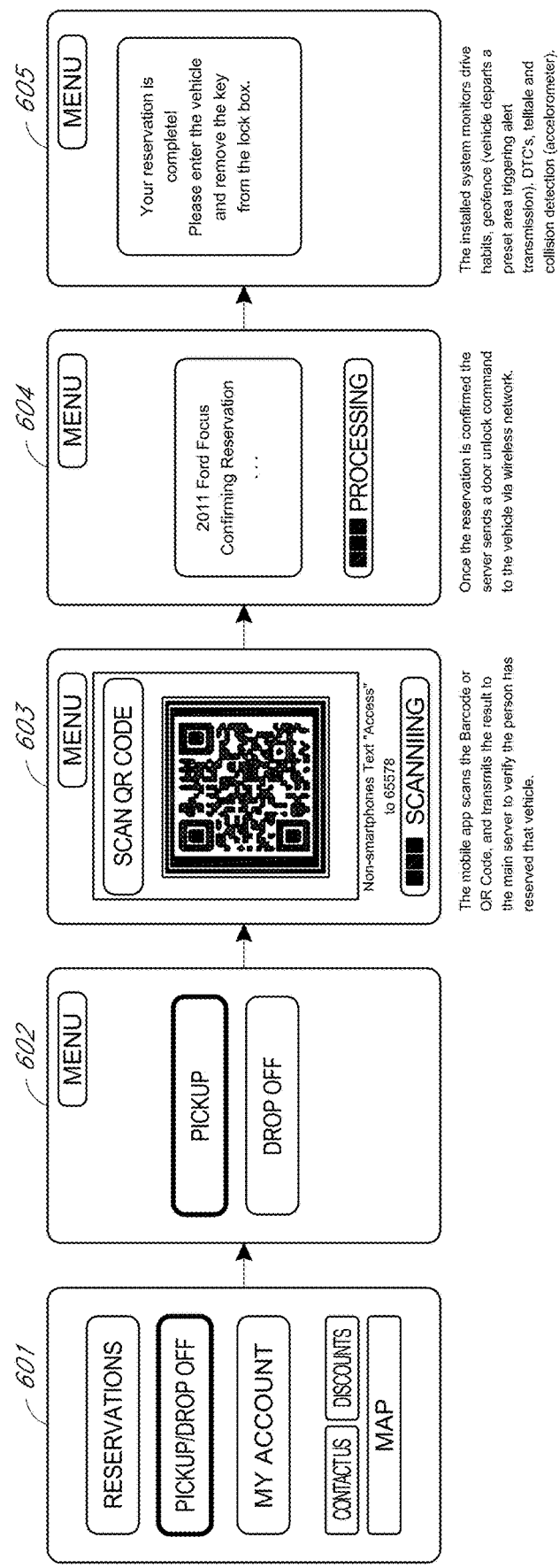
FIG. 6 is an example embodiment's series of displays and menus that are shown on a mobile device by a mobile app for allowing a customer to enter data during a vehicle pick up process.

FIG. 6 is a series of displays and menus that are shown on the mobile device by a mobile app used by members or customers for a rental service or a car share service. The mobile application may allow a customer to enter data during the vehicle pick up process in order to speed up the process. For example, a customer may select "pickup" from a list of menu options in the mobile application running on their mobile, wirelessly connected device 601, 602. The mobile application may then query the user to scan a QR code, bar code or other identifier associated with the vehicle to be picked up. Using the camera of the mobile communication device, such as a mobile phone, the customer scans the barcode or QR code on the window decal 603. The QR code is usually placed on the rental vehicle, as described above. This will allow the mobile application to determine the correct identifier associated with the vehicle. Other methods of input for this identifier are also contemplated for this procedure, including, but not limited to NFC communication with the control module to transfer the identifier, or texting a specific phone number associated with the car or rental service (the appropriate car may be unlocked via the rental service knowing which car was reserved for the user associated with a mobile phone). After the vehicle's identifier has been determined, the mobile application may transmit a reservation request and the identifier to the remote servers to verify the person has reserved that vehicle 604. If the remote servers verify the reservation, a confirmation may appear on the mobile device 605, and the remote servers may command the car, via communication with the control module over a wireless network, to unlock the doors. The control module may then consult the stored command(s) associated with unlocking the cars (as determined based on autoconfiguration for example), and send those commands to the CAN bus to unlock the doors. The user may then enter the car, and use the keys found within to drive the vehicle. The control module may then begin to monitor driver behavior using the accelerometer and other information queried via the OBD2 port (or other vehicle bus connector) or CAN bus, as described above (such as driver habits, going past a geofence (if a vehicle departs a preset area, and alert is sent to the installer, remote servers/admins, or the user), diagnostic trouble codes (DTCs), or collisions.

In another embodiment, the control module may have an RFID reader that can detect a mobile device and send the mobile device's ID to the remote servers (which can then in turn, send the vehicle's ID to the mobile device, or immediately confirm the reservation and unlock the doors).

Figure 7:
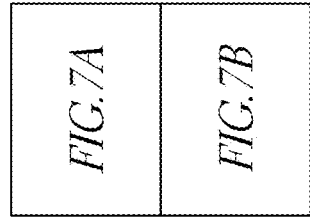
FIGS. 7, 7A, and 7B show an example embodiment's series of displays and menus that are shown on a mobile device by a mobile app for allowing a customer to reserve a vehicle.
Figure 7A:
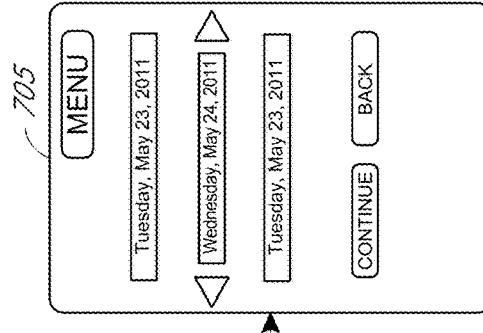
Figure 7A:
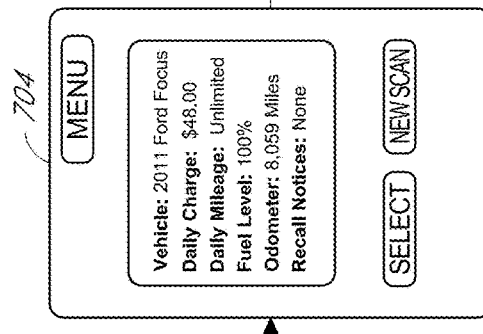
Figure 7A:
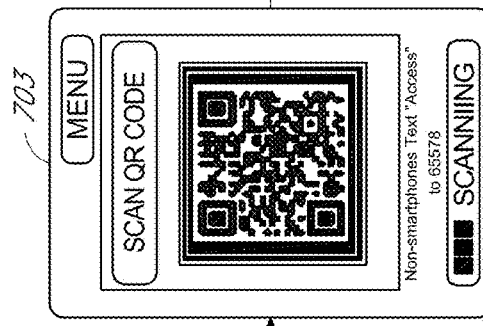
Figure 7A:
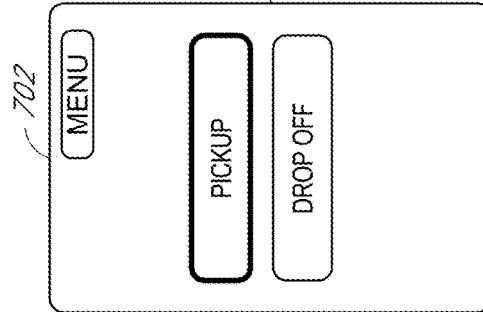
Figure 7A:
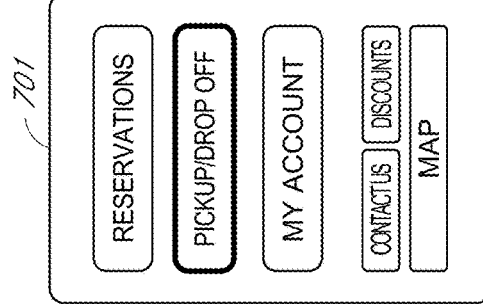
Figure 7B:
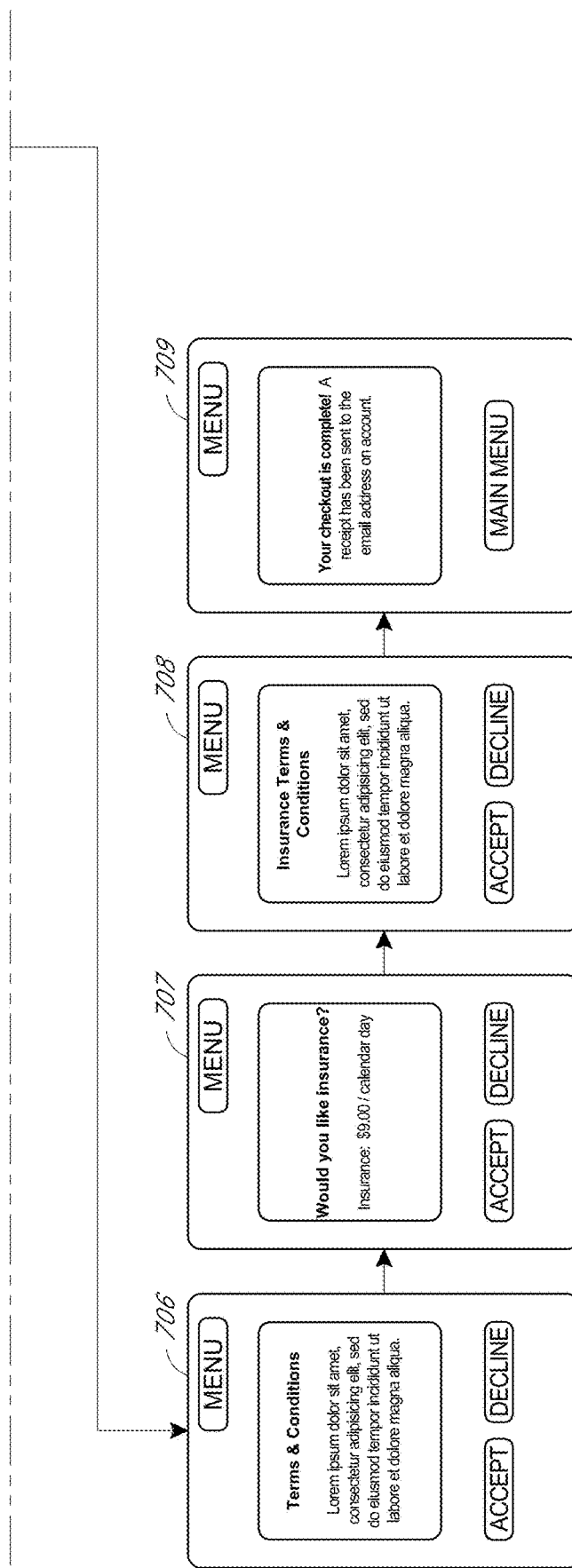

FIGS. 7, 7A, and 7B show a series of example displays and menus that may be shown on the mobile device by a mobile app used by customers to enter data during a non-reservation vehicle pick up process. The user may select that he is picking up a car, or that he wishes to reserve a car (701, 702). Using the camera of the mobile communication device, such as a mobile phone, the customer scans the barcode or QR code on the window decal to download the vehicle information 703. The rental fee and vehicle specific information may then be displayed for the consumer 704. This information may have been embedded in the QR code, or may have been received from the remote servers (e.g. the QR code may have contained a vehicle ID, which may then be sent to the remote servers, which respond with information about the vehicle, and may put a temporary reservation on the vehicle until the transaction either succeeds, or is cancelled/times out). The customer may then select or customize certain reservation criteria, such as the length of time to rent/use the car 705, accept terms and conditions required by the rental or car share service to use the car 706, be offered insurance 707 with its own terms and conditions 708, etc. This information may then be sent to the remote servers to either confirm or reject the reservation based on this information. To perform this operation, the remote servers may consult with a third party, such as a rental or car share server, to transact the reservation. If the reservation is available, and payment succeeds (e.g. a credit card either type into the app or associated with the customer is verified), then the reservation may be confirmed. The confirmation may be transferred to the mobile device, and may also be sent via text or email to the customer email account. At this point, as with a normal reservation, the doors may be unlocked remotely by commands sent by the remote servers.

Figure 8:
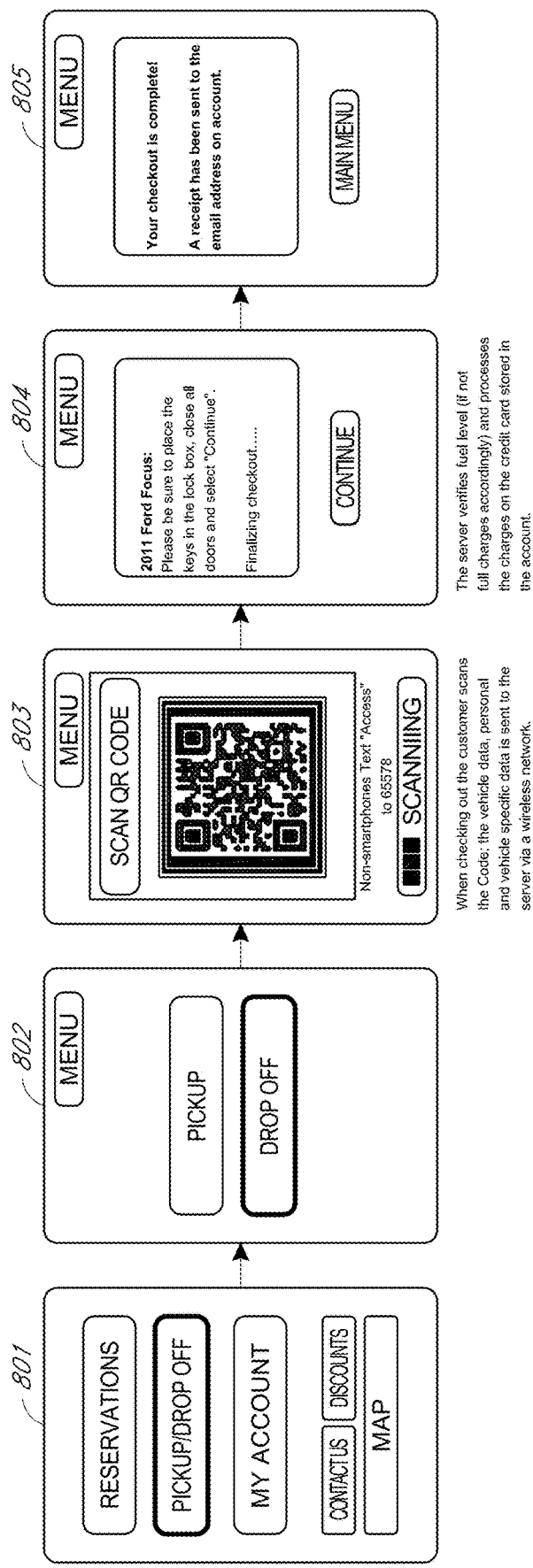
FIG. 8 is an example embodiment's series of displays and menus that are shown on a mobile device by a mobile app for allowing a customer to enter data during a vehicle drop off process.
Figure 9:
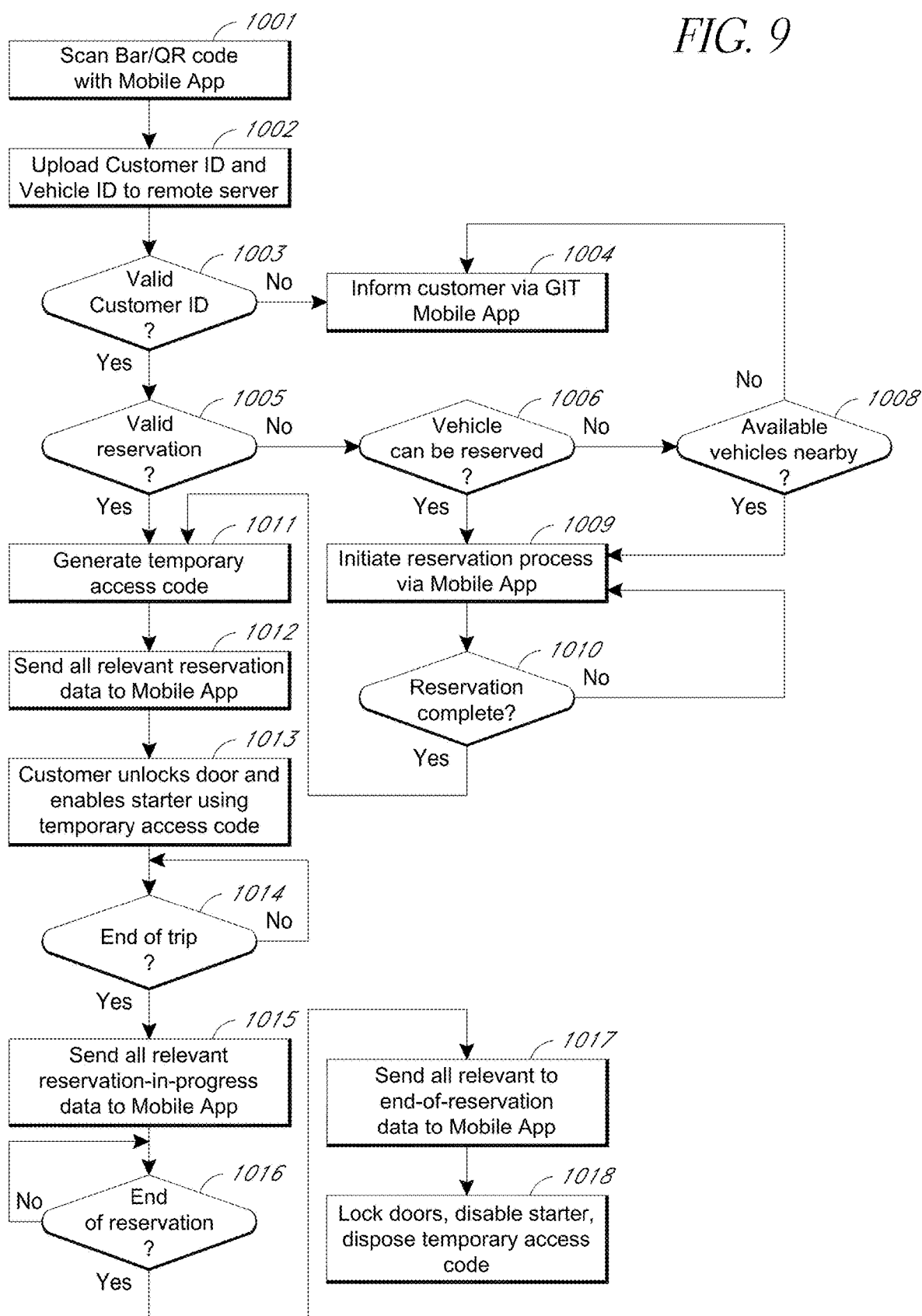
FIG. 9 is an example flow diagram illustrating the steps of accessing an example reserved rental/car-share (RCS) vehicle.

FIG. 8 is a series of example displays and menus that are shown on a mobile device by a mobile app for allowing a customer to enter data during the vehicle drop off process. When checking out (801, 802), the customer may scans the barcode or QR code on the window decal 803 (or use any other identification mechanism to input an identifier). The vehicle data and the personal and vehicle specific data is sent to the remote servers via the wireless network. The servers verify the fuel level (and if not full, charges accordingly), and process the charges on the credit card of the customer's account 804. The mobile app displays a confirmation message and sends a receipt to the email address on the customer's account or via SMS text.

In some embodiments, the user may receive an access code for frequent access to a vehicle during a reservation. A customer may start the mobile app, which includes a QR Code scanner and will scan the QR code associated with the vehicle from the sticker visible from outside of the car 1001. (Any other input method may be used, including NFC communication, or taking a digital photograph of the car's license plate or VIN and converting that to an identifier, or sending the photograph to the remote servers to be converted).

The scanned QR code, or other input may then be decoded to determine the vehicle's identifier. This identifier, along with an identifier of the customer may be uploaded to the remote servers via the mobile device's wireless network connection for verification 1002. The customer identifier may include a phone number/ESN (electronic serial number) and mobile account information, or other identifier. These identifier may be encrypted.

The remote servers may then test to determine whether that customer is in its database based on the identifier provided 1003. If so, and that customer is a valid customer 1003 (e.g. subscribed, up to date on payments, such checks may require communication with the RCS provider), then the remote server continues on to check for a reservation 1005. If the customer isn't valid, then the customer may receive via the mobile app an indication that they are not a valid customer 1004 (e.g. the remote server sent back an error message).

If the remote servers' database contains a valid reservation for the identified car for the identifier customer at or near the time period the request is made, then the reservation may be considered valid. If not valid, then the remote system may determine if the vehicle is not reserved 1006 and allow for an immediate reservation to be made 1009. If the vehicle cannot be reserved, the remote system may determine if any nearby vehicles may be reserved, and if so, transfer that information back to the mobile device, including the location of the proposed vehicles 1008. If no vehicles are nearby that can be reserved, an error message is transmitted back to the mobile application 1004. Assuming the inquired vehicle, or nearby vehicles, can be reserved, the remote servers may initiate the reservation process via the mobile application 1009. An example of such a reservation is disclosed herein under the discussion of FIGS. 7, 7A, and 7B.

Once the customer has reserved the vehicle a temporary access code may be generated by the remote server 1011. The access code may be sent to the mobile application for storage, along with all relevant reservation data 1012 (i.e. length of reservation, dates, times, destination, starting places, prices for all services, services included, etc.) The access code may now be used by the customer to begin using the car. This may be done in multiple ways. First, the access code itself may be transmitted from the remote servers to the control module. Then, if the access code is presented by the mobile device to the control module (e.g. using NFC for example), and it is a match with the access code on the control module, the control module will unlock all the doors and enables the starter 1013 (e.g. through commands sent to the CAN buses and/or starter as described herein). In some embodiments, the temporary access code may instead be sent from the mobile device to the remote servers. If the access code matches the access code that the remote servers have associated with an active reservation, the remote servers will send a command to the control module to unlock the doors for the customer and enable the starter 2013.

When a customer's trip ends 1014 (for example, time of the reservation has run out and/or the destination has been reached or approached which can be tracked via GPS data uploaded to the remote servers from the control module), all relevant reservation in progress data is sent to the mobile app from the remote servers 1015 (i.e. checkout information, fuel information, etc.). If the customer confirms that the reservation is over, then all end of reservation data may be sent to the mobile app 1017, such as the final checkout receipt and inspection of the vehicle. After the reservation is over, the remote servers may send a command to the control module to disable the starter, lock the doors, and dispose of the temporary access code if any.

In some embodiments, the customer's mobile application may further comprise user interfaces and functionality for communication, over the wireless network/Internet, with the rental car service or car share service (e.g. their severs) during the rental period. For example, these user interfaces may allow a use to terminate a reservation, extend a reservation, purchase gas plans or insurance, add new drivers, change reservations, or contact a customer service representative. By putting this functionality into an application on a mobile device such as a mobile phone, it reduces custom hardware and software requirements by leveraging existing customer hardware. In addition, it saves on wireless data costs paid for by the rental/carshare service.

Gas Stop Detection and Notice Nearing Final Destination

Figure 10:
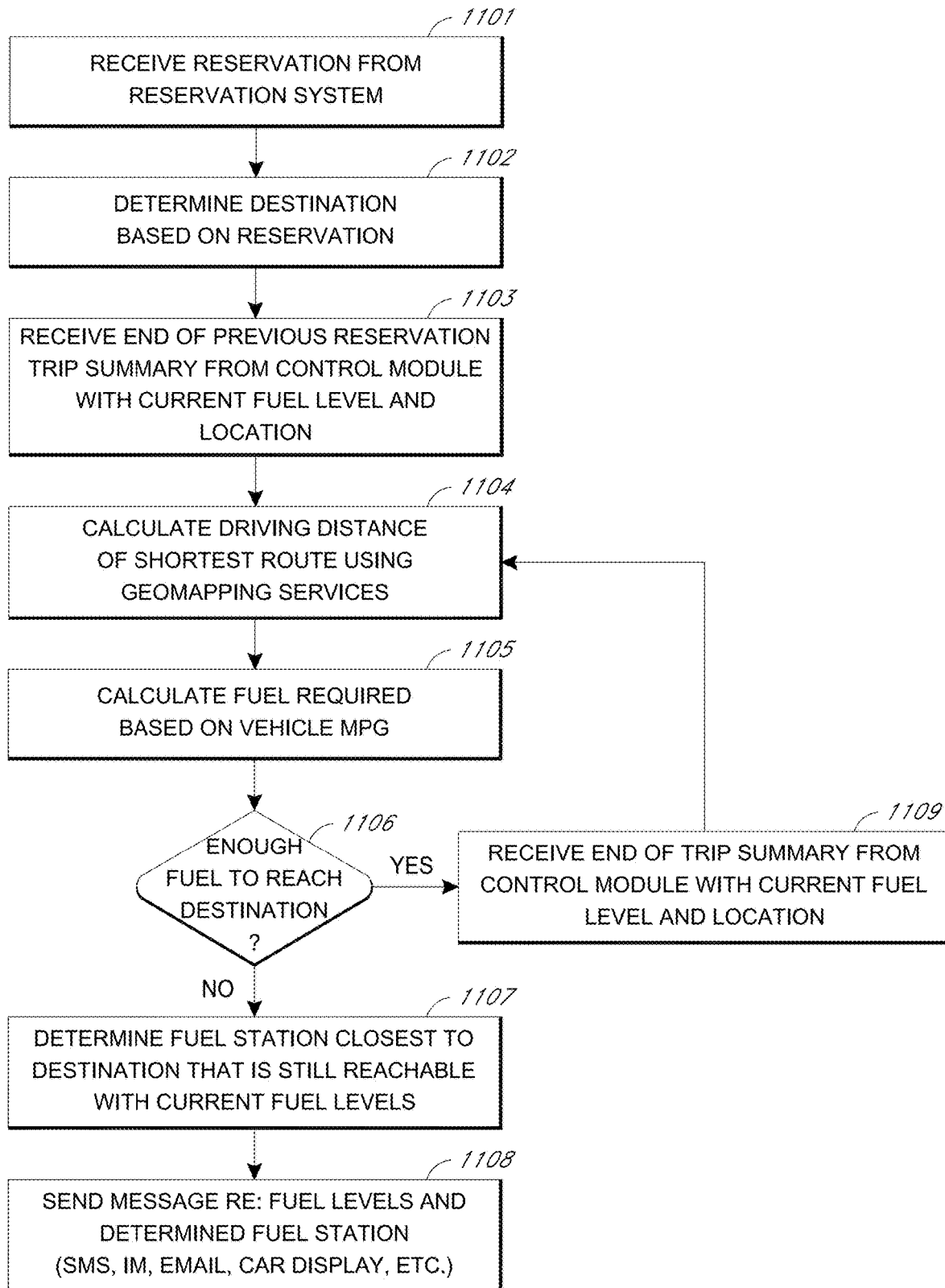
FIG. 10 is an example flow diagram illustrating one embodiment's method for detection and location of gas availability.

In FIG. 10, one embodiment is described where the user may be notified about whether they need to stop for gas prior to returning a vehicle. In block 1101, the remote servers may receive a reservation from the reservations system (e.g. the rental company or the car share company's IT infrastructure). The remote servers may determine the destination for the car associated with the reservation based on the return site listed in the reservation 1101.

The remote servers, in 1103, may then receive, from the control module (or by looking up in its own database), the reservation trip summary from the previous trip to determine current fuel levels and a location of the vehicle. A trip summary is a report that may contain data about the current status of a vehicle, including the fuel level, its location, miles per gallon of the vehicle based on the trip, among other data. (In various embodiments, this information need not be received via a reservation trip summary. Instead, this information (location, fuel, mpg) may be periodically uploaded to the remote servers by the control module, and the same process may be performed).

Regardless of how the data from the control module is sent to the remote servers, using the vehicles location, the remote servers may calculate the driving distance of the associated vehicle of the shortest route to the destination of the new reservation 1104. Based on this distance, and the mpg of the vehicle, the remote servers may calculate the fuel required to reach the destination 1105. If there is enough fuel to reach the destination 1106, the remote servers may repeat this process 1009. As the vehicle progresses through its trip, it will periodically upload new information (new location, new fuel level, optionally new mpg) in an end of trip summary (or any other format). The remote servers may then recalculate the distance and fuel calculations to determine whether there is enough fuel to reach the destination.

If at any time, it is determined that there is not enough fuel to reach the destination, the remote servers may calculate the fuel station closest to the destination that is still reachable with current fuel levels 1107. This may be performed with geomapping services such as Google Maps. The destination may then be transmitted to the user or the control module 1108. For example, the user may receive a text message about the current fuel level, the inability to reach the destination, and the location of the calculated fuel station to stop at. This may include a map or other information usable to find the fuel station. This may be transferred via SMS, IM, email, or in car display). This information may also be transmitted over wireless to the control module. For example, the control module may interface with an onboard navigation unit to change the navigation unit to now navigate to the fuel station instead of the vehicle's destination.

This process may also apply to other locations besides the final destination. For example, a customer may make a reservation and insert information into their trip log to indicate multiple destinations. The destination used for measuring and comparison in this process can then be the next destination instead of the final destination.

This "last chance to get gas" process may be further expandable to other consumable services that can be mapped. For example, there may be a "last chance for food" feature where, based on location, destination, and current fuel, the remote servers may be able to inform the customer if they should stop for food in a certain location. Other possibilities to consider are rest stops, oil, water, etc.

Other Features

In some embodiments, remote servers will interface with a user's mobile device application or other client GUI to gather vehicle and customer data. The vehicle data may include the destination or drop off location or lot. The remote servers may then know to forward, and may forward, vehicle maintenance related notifications to the registered recipient at the destination or drop off location upon the vehicles arrival and/or end of reservation. Arrival may be determined when the vehicle enters the geofence/geozone associated with the lot, for example, by constantly polling GPS information in the control module. This may trigger a notice to a remote server, installer, or user upon arrival.

In some embodiments, a maintenance feature of the control module enables vehicle maintenance/service personnel to receive geo-specific (vehicles on lots they service) vehicle maintenance alerts (diagnostic trouble code and/or mileage based maintenance). For example, if a vehicles check engine light is ON, the control module would send a diagnostic alert (e.g. device ID, time/date, location and Diagnostic Trouble Code or DTC) to the remote servers. The remote servers may push (email, SMS and/or sent to a mobile application as a notification) the information to service personnel assigned to receive vehicle diagnostic alerts at that the closest location near the car. The maintenance feature has a Find feature that will enable the service personnel to navigate to the vehicle on the lot using GPS information from the control module and transmitted to the installer's mobile device via the remote servers.

Example System Implementation and Architecture

Figure 11:
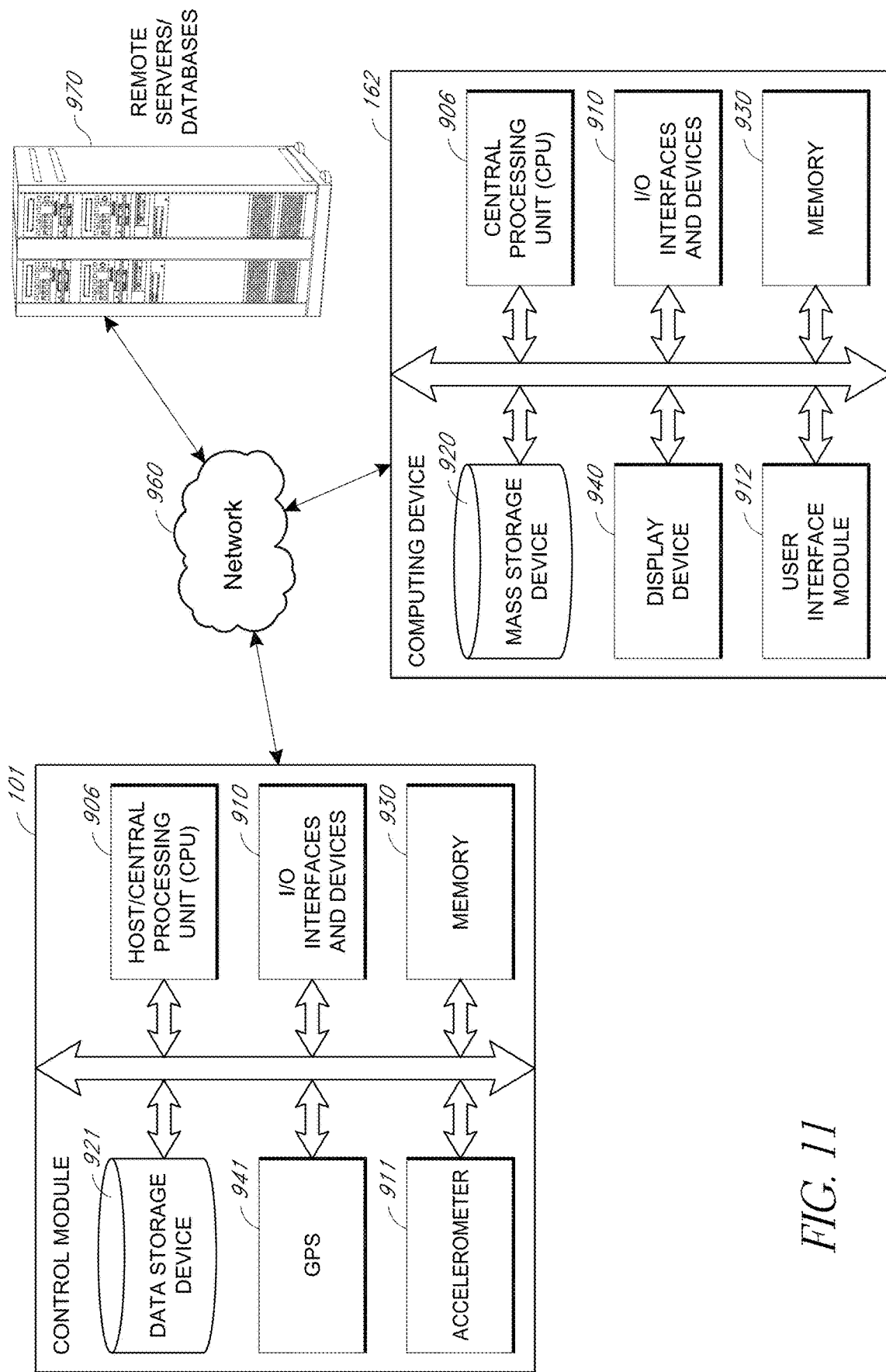
FIG. 11 is a block diagram illustrating computer system configurations for various embodiments.

FIG. 11 is a block diagram showing an embodiment of computing device 162, and control module 101, which may be in communication with network 160 (wireless networks connected to the Internet) and various computing systems, such as remote servers 970, that are also in communication with the network 160. The computing device 162 and/or the control module 101 may be used to implement systems and methods described herein.

As described above, some embodiments may include portions that are executed by the remote servers 970 and/or by the computing device 162 and/or the control unit 101, or are entirely executed by the remote servers 970 or the computing device 162, or the control unit 101. Thus, discussion herein of any structure (e.g. cpu, memory, etc) of the computing device 162 or control module 101, or operations performed by the computing device 162 or control module 101, may be equally applied to the remote servers 970.

The computing device 162 (e.g. the mobile device that executes mobile applications described herein) includes, for example, a personal computer that is IBM, Macintosh, iOS, Android or Linux/Unix compatible or a server or workstation. In one embodiment, the computing device 162 comprises a server, a laptop computer, a smart phone, a personal digital assistant, a kiosk, or an media player, for example. In one embodiment, the exemplary computing device 162 includes one or more central processing unit ("CPU") 905, which may each include a conventional or proprietary microprocessor. The computing device 162 further includes one or more memory 930, such as random access memory ("RAM") for temporary storage of information, one or more read only memory ("ROM") for permanent storage of information, and one or more mass storage device 920, such as a hard drive, diskette, solid state drive, or optical media storage device. Typically, the modules of the computing device 162 may be connected to the computer using a standard based bus system 980. In different embodiments, the standard based bus system could be implemented in Peripheral Component Interconnect ("PCP"), Microchannel, Small Computer System Interface ("SCSI"), Industrial Standard Architecture ("ISA") and Extended ISA ("EISA") architectures, for example. In addition, the functionality provided for in the components and modules of computing device 162 may be combined into fewer components and modules or further separated into additional components and modules, and executed in software, hardware, or a combination of hardware and software.

The computing device 162 is generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, or other compatible operating systems. In Macintosh systems, the operating system may be any available operating system, such as MAC OS X. In other embodiments, the computing device 162 may be controlled by a proprietary operating system. Conventional operating systems control and schedule computer processes for execution, perform memory management, provide file system, networking, I/O services, and provide a user interface functionality usable by the user interface module 110, such as a graphical user interface ("GUI"), among other things.

The exemplary computing device 162 may include one or more commonly available input/output (I/O) devices and interfaces 910, such as a keyboard, mouse, touchscreen, and printer. In one embodiment, the I/O devices and interfaces 910 include one or more display devices, such as a monitor or touchscreen 940, that allows the visual presentation of data to a user. More particularly, a display device provides for the presentation of GUIs, application software data, and multimedia presentations, for example. The computing device 162 may also include one or more multimedia devices, such as speakers, video cards, graphics accelerators, and microphones, for example.

In the embodiment of FIG. 11, the I/O devices and interfaces 910 provide a communication interface to various external devices. In the embodiment of FIG. 11, the computing device 162 is electronically coupled to a network 160 (as shown in FIG. 1), which comprises one or more of a LAN, WAN, and/or the Internet, for example, via a wired, wireless (such as 802.11 networks or a cell phone network), or combination of wired and wireless, communication link. The network 160 communicates with various computing devices and/or other electronic devices via wired or wireless communication links.

In some embodiments information may be provided to the computing device 162 over the network 160 from remote servers 970. Similarly, in some embodiments, information may be provided to the remote servers 970 over the network 160 control module 101 or computing device 162. The remote servers 970 may include one or more internal and/or external data sources. The data sources may include internal and external data sources which store, for example, rental car or car share reservation data, and vehicle, control unit and customer data and properties, and associations thereof. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 11, the computing device 162 includes a user interface module 912 that may be stored in the mass storage device 920 as executable software codes that are executed by the CPU 905. This and other modules in the computing device 162 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 11, the computing device 162 is configured to the execute the user interface module 112 in order to for example, reserve and pickup vehicles, and perform and visualize other operations described herein.

User interface module 912 may generate and render, for example, user interfaces depicted in FIGS. 5, 7, 8, etc. By interacting with these user interfaces, a user of computing device 162 may view various information about their reservation and associated car.

In general, the word "module," as used herein (except as otherwise defined, such as in control module), refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, such as the computing device 162, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Like the computing device 162, remote servers 970 and control module 101 may comprise similar computing hardware, software, and functionality as described above for computing device 162.

Other

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the remote servers 970, control module 101, consumer computing device 162, and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. An apparatus comprising:
control hardware for use in a vehicle to enable a remote computing system to wirelessly communicate instructions to the vehicle via the control hardware, the control hardware comprising:
  a processor;
  a wireless network interface for interfacing the processor with a wireless network; and
  a vehicle interface for interfacing the processor with a controller area network (CAN) bus of the vehicle, the vehicle interface comprising a plurality of CAN bus transceivers, each CAN bus transceiver for interfacing the processor with a CAN bus type of at least one vehicle type so that the plurality of CAN bus transceivers will interface the processor with the CAN bus types of a plurality of different vehicle types in the aggregate;
  wherein the processor is operable to (1) automatically detect an identifier for the vehicle through the vehicle interface, (2) automatically select a CAN bus transceiver from among the plurality of CAN bus transceivers based on the detected identifier, and (3) provide a communication path between the remote computing system and the vehicle's CAN bus via wireless network interface and the selected CAN bus transceiver.

2. The apparatus of claim 1 wherein the control hardware further comprises a memory in which configuration information for a plurality of different vehicle types is stored, and wherein the processor is further operable to (1) determine the vehicle type for the vehicle based on the detected identifier, (2) retrieve the configuration information for the determined vehicle type from the memory, and (3) select the CAN bus transceiver from among the plurality of CAN bus transceivers in accordance with the retrieved configuration information.

3. The apparatus of claim 2 wherein the stored configuration information comprises a plurality of codes for controlling a plurality of vehicle functions, wherein the codes vary by vehicle type such that a plurality of different vehicle types exhibit a plurality of different codes for the vehicle functions, and wherein the processor is further operable to (1) receive an instruction from the remote computing system via the wireless network interface, the instruction comprising a command for the vehicle to perform a function, (2) retrieve from the memory the stored code for the vehicle function corresponding to the received command instruction based on the determined vehicle type, and (3) communicate the retrieved code to the vehicle via the vehicle interface to thereby cause the vehicle to perform the function corresponding to the received command instruction.

4. The apparatus of claim 3 wherein the function corresponding to the received command instruction comprises a member of the group consisting of (1) enabling/disabling a starter for the vehicle, (2) locking/unlocking a door for the vehicle, (3) flashing lights for the vehicle, (4) opening/closing a window for the vehicle, (5) opening/closing a sunroof for the vehicle, (6) sounding a horn for the vehicle, and (7) opening or unlocking a trunk for the vehicle.

5. The apparatus of claim 3 wherein the processor is further operable to interact with the remote computing system via the wireless interface to be authenticated and credentialed for accessing the vehicle via the vehicle interface.

6. The apparatus of claim 2 wherein the detected identifier is a vehicle identification number (VIN), and wherein the processor is further operable to (1) request and receive the VIN from the vehicle via the vehicle interface and (2) decode the VIN to determine the vehicle type.

7. The apparatus of claim 1 wherein the processor is further operable to (1) send the detected identifier to a remote server via the wireless interface, (2) receive configuration information for the vehicle from the remote server via the wireless interface, and (3) select the CAN bus transceiver from among the plurality of CAN bus transceivers in accordance with the received configuration information.

8. The apparatus of claim 7 wherein the control hardware further comprises a memory, wherein the received configuration information includes a plurality of codes for controlling a plurality of functions of the vehicle, and wherein the processor is further operable to (1) store the codes in the memory, (2) receive an instruction from the remote computing system via the wireless network interface, the instruction comprising a command for the vehicle to perform a function, (3) retrieve from the memory the stored code for the vehicle function corresponding to the received command instruction, and (4) communicate the retrieved code to the vehicle via the vehicle interface to thereby cause the vehicle to perform the function corresponding to the received command instruction.

9. The apparatus of claim 8 wherein the function corresponding to the received command instruction comprises a member of the group consisting of (1) enabling/disabling a starter for the vehicle, (2) locking/unlocking a door for the vehicle, (3) flashing lights for the vehicle, (4) opening/closing a window for the vehicle, (5) opening/closing a sunroof for the vehicle, (6) sounding a horn for the vehicle, and (7) opening or unlocking a trunk for the vehicle.

10. The apparatus of claim 8 wherein the stored codes include a code for enabling/disabling a starter for the vehicle.

11. The apparatus of claim 10 wherein the stored codes further include a code for locking/unlocking a door for the vehicle.

12. The apparatus of claim 8 wherein the stored codes include a code for locking/unlocking a door for the vehicle.

13. The apparatus of claim 1 wherein the vehicle interface further comprises a multiplexer, the multiplexer including a data input line, a channel select input line, and a plurality of channel output lines, each channel output line connected to a different CAN bus transceiver, and wherein the processor is further operable to select the CAN bus transceiver from among the plurality of CAN bus transceivers via a control signal applied to the channel select input line, the control signal causing the multiplexer to connect the data input line with the channel output line for the selected CAN bus transceiver.

14. The apparatus of claim 13 wherein the channel select input line comprises a plurality of channel select pins.

15. The apparatus of claim 1 wherein the processor comprises a plurality of processors.

16. The apparatus of claim 1 wherein the control hardware further comprises a GPS chipset in communication with the processor and an accelerometer in communication with the processor.

17. The apparatus of claim 1 wherein the vehicle interface includes a physical connector, the control hardware configured to detachably connect with a vehicle bus connector of the vehicle via the physical connector.

18. The apparatus of claim 1 wherein the control hardware does not include a DIP switch configured to provide for manual selection between the CAN bus transceivers.

19. The apparatus of claim 1 wherein the CAN bus transceivers comprise (1) a first CAN bus transceiver for communication with a first type of CAN bus and (2) a second CAN bus transceiver for communication with a second type of CAN bus.

20. The apparatus of claim 19 wherein the first CAN bus type is used for communication with an electronic control unit (ECU) of a vehicle, and wherein the second CAN bus type is used for communication with a body control module (BCM) of a vehicle.

21. The apparatus of claim 1 wherein the vehicle interface interfaces the processor with another vehicle bus of the vehicle, wherein the another vehicle bus comprises at least one of a LIN (Local Interconnected Network) bus, a FlexRay bus, a MOST (Media Oriented System Transport) bus, a USB (Universal Serial Bus), and an Ethernet bus.

22. The apparatus of claim 1 wherein the CAN bus comprises a CAN-FD bus.

23. A network-based method for wireless remote control of a vehicle, the method comprising:
authenticating that control hardware in the vehicle is authorized to access vehicle information and control vehicle functions, wherein the control hardware comprises (1) a processor, (2) a wireless network interface, and (3) a vehicle interface;
interfacing the processor with a wireless network via the wireless network interface;
interfacing the processor with a controller area network (CAN) bus of the vehicle via the vehicle interface, the vehicle interface comprising a plurality of CAN bus transceivers, wherein each CAN bus transceiver interfaces the processor with a CAN bus type of at least one vehicle type so that the plurality of CAN bus transceivers interface the processor with the CAN bus types of a plurality of different vehicle types in the aggregate; and in response to the authenticating step resulting in a determination that the control hardware is authorized to access vehicle information and control vehicle functions, the processor (1) automatically detecting an identifier for the vehicle through the vehicle interface, (2) automatically selecting a CAN bus transceiver from among the plurality of CAN bus transceivers based on the detected identifier, and (3) remotely controlling a vehicle function of the vehicle by (i) receiving data over the wireless network via the wireless network interface and (ii) communicating with the vehicle's CAN bus via the selected CAN bus transceiver based on the received data; and wherein the remotely controlled vehicle function comprises a member of the group consisting of (1) enabling/disabling a starter for the vehicle, (2) locking/unlocking a door for the vehicle, (3) flashing lights for the vehicle, (4) opening/closing a window for the vehicle, (5) opening/closing a sunroof for the vehicle, (6) sounding a horn for the vehicle, and (7) opening or unlocking a trunk for the vehicle.

\* \* \* \* \*